(12) United States Patent
Jang et al.

(10) Patent No.: US 10,788,955 B2
(45) Date of Patent: Sep. 29, 2020

(54) METHOD FOR CONTROLLING DISPLAY AND ELECTRONIC DEVICE SUPPORTING THE SAME

(71) Applicant: Samsung Electronics Co., Ltd., Gyeonggi-do (KR)

(72) Inventors: Dong Ho Jang, Gyeonggi-do (KR); Doo Suk Kang, Gyeonggi-do (KR); Kyung Tae Kim, Gyeonggi-do (KR); Ga Jin Song, Gyeonggi-do (KR); Yong Joon Jeon, Gyeonggi-do (KR); Jae Woo Suh, Seoul (KR); Jeong Pyo Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 24 days.

(21) Appl. No.: 16/019,974

(22) Filed: Jun. 27, 2018

(65) Prior Publication Data
US 2019/0004673 A1 Jan. 3, 2019

(30) Foreign Application Priority Data
Jun. 28, 2017 (KR) .......................... 10-2017-0082050

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0488* (2013.01); *G06F 3/167* (2013.01); *G06F 9/451* (2018.02)

(58) Field of Classification Search
None
See application file for complete search history.

(56) References Cited

U.S. PATENT DOCUMENTS

| 5,632,002 A | 5/1997 | Hashimoto et al. |
| 9,104,476 B2 | 8/2015 | Van Milligan et al. |

(Continued)

FOREIGN PATENT DOCUMENTS

| KR | 10-0727949 B1 | 6/2007 |
| KR | 10-2010-0010299 A | 2/2010 |

(Continued)

OTHER PUBLICATIONS

Maria Karam et al., Comparing Gesture and Touch for Notification System Interactions, Feb. 1, 2009, IEEE Computer Society, pp. 7-12 (Year: 2009).*

(Continued)

*Primary Examiner* — Tam T Tran
(74) *Attorney, Agent, or Firm* — Cha & Reiter, LLC.

(57) ABSTRACT

An electronic device is configured to support a multitasking environment, the electronic device comprises a communication circuit configured to communicate with at least one external device; a microphone configured to receive voice input; a memory storing a plurality of application programs; a display configured to output a plurality of virtual windows as the plurality of application programs are executed and at least one processor electrically connected with the communication circuit, the microphone, the memory, and the display, wherein the processor is configured to execute the plurality of application programs, determine whether at least one condition is satisfied for controlling a background state of a first window, when a first voice input is generated for controlling a function of a first application program in the first window that is in the background state, and maintain the first window in the background state and a second window, which is associated with a second application program, to be in a foreground state, while processing the first user input, when the at least one condition is satisfied.

20 Claims, 21 Drawing Sheets

(51) Int. Cl.
*G06F 3/0488* (2013.01)
*G06F 3/16* (2006.01)
*G06F 9/451* (2018.01)

(56) References Cited

U.S. PATENT DOCUMENTS

| | | |
|---|---|---|
| 9,135,059 B2 | 9/2015 | Ballard et al. |
| 9,959,129 B2 | 5/2018 | Kannan et al. |
| 2010/0023888 A1 | 1/2010 | Song |
| 2011/0249668 A1 | 10/2011 | Van Milligan et al. |
| 2011/0252422 A1 | 10/2011 | Rothert et al. |
| 2011/0252423 A1 | 10/2011 | Freedman et al. |
| 2011/0252429 A1 | 10/2011 | Ballard et al. |
| 2011/0252430 A1 | 10/2011 | Chapman et al. |
| 2012/0185798 A1* | 7/2012 | Louch .................. G06F 3/0481 715/796 |
| 2014/0122090 A1* | 5/2014 | Park ....................... G06F 3/167 704/275 |
| 2015/0039317 A1 | 2/2015 | Klein et al. |
| 2016/0147388 A1* | 5/2016 | Shin ..................... G06F 3/0482 715/728 |
| 2016/0203002 A1 | 7/2016 | Kannan et al. |
| 2016/0293164 A1* | 10/2016 | Shi ...................... G06F 3/04842 |
| 2018/0090143 A1* | 3/2018 | Saddler .................. G10L 15/22 |

FOREIGN PATENT DOCUMENTS

| | | |
|---|---|---|
| KR | 10-2015-0104930 A | 9/2015 |
| KR | 10-2016-0071843 A | 6/2016 |

OTHER PUBLICATIONS

Takahiro Iwata et al., Towards a Mobility Enhanced User Interface Design for Multi-task Environments, Jul. 1, 2010, IEEE Computer Society, pp. 106-111 (Year: 2010).*
International Search Report dated Sep. 27, 2018.
European Search Report dated Apr. 24, 2020.

* cited by examiner

METHOD FOR CONTROLLING DISPLAY AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2017-0082050, filed on Jun. 28, 2017, in the Korean Intellectual Property Office, the disclosure of which is incorporated by reference herein its entirety.

TECHNICAL FIELD

The disclosure relates to a method for controlling a display and an electronic device supporting the same.

BACKGROUND

Recently, electronic devices employ various input manners including voice input. With the numerous input manners, it is important to prevent inadvertent input resulting in unintended operation by the electronic device.

The above information is presented as background information only to assist with an understanding of the present disclosure. No determination has been made, and no assertion is made, as to whether any of the above might be applicable as prior art with regard to the present disclosure.

SUMMARY

Electronic devices can include various input manners for the interaction with a user. For example, the electronic device can support voice input, in addition to an input device such as a keyboard, a mouse, a touch pen, or a touch pad. In addition, the electronic device may support a multimodal interface-based input manner of simultaneously employing the above-described input devices.

According to multimodal interface-based input, multiple simultaneous controls are possible for performing functions of the electronic device, and the electronic device may use multitasking to execute a plurality of programs.

When multimodal interface-based inputs are processed in a multitasking environment, the windows (e.g., program execution screens) for programs receiving inputs may be changed to a foreground state or a background state.

The change in the state of the windows might not be intended by a user and might cause the state of the windows to be re-changed. In addition, an input (e.g., an input through a keyboard) generated may be applied to a window the foreground state regardless of user intent. In some cases, a first input for an application program run in a first window may cause the first window to be changed to the foreground state while changing a second window running a second application to a background state, contrary to the user's intent. Shortly thereafter, a user may provide an input for second application. However, since the second application is run in a window that was changed to the background state due to the first input, the input intended for the second application might not be properly received by the second application.

Aspects of the present disclosure are to address at least the above-mentioned problems and/or disadvantages and to provide at least the advantages described below. Accordingly, an aspect of the present disclosure is to provide a method for controlling a display associated with handling a user input based on the multimodal interface under the multitasking environment and an electronic device supporting the same.

In accordance with an aspect of the present disclosure, an electronic device supporting a multitasking environment may include a communication circuit to communicate with at least one external device, a microphone to receive user utterance, a memory to store a plurality of application programs, a display to output a plurality of virtual windows as the plurality of application programs are executed, and a processor electrically connected with the communication circuit, the microphone, the memory, and the display.

According to various embodiments, an electronic device supporting a multitasking environment, the electronic device comprises a communication circuit configured to communicate with at least one external device; a microphone configured to receive voice input; a memory storing a plurality of application programs; a display configured to output a plurality of virtual windows as the plurality of application programs are executed and at least one processor electrically connected with the communication circuit, the microphone, the memory, and the display, wherein the processor is configured to execute the plurality of application programs, determine whether at least one condition is satisfied for controlling a background state of a first window, when a first voice input is generated for controlling a function of a first application program in the first window that is in the background state, and maintain the first window in the background state and a second window, which is associated with a second application program, to be in a foreground state, while processing the first user input, when the at least one condition is satisfied.

As described above, according to various embodiments, the change in the state of the windows associated with multitasking operation between a foreground state or a background state may be controlled and thus the user inputs may be more clearly applied to the windows.

Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
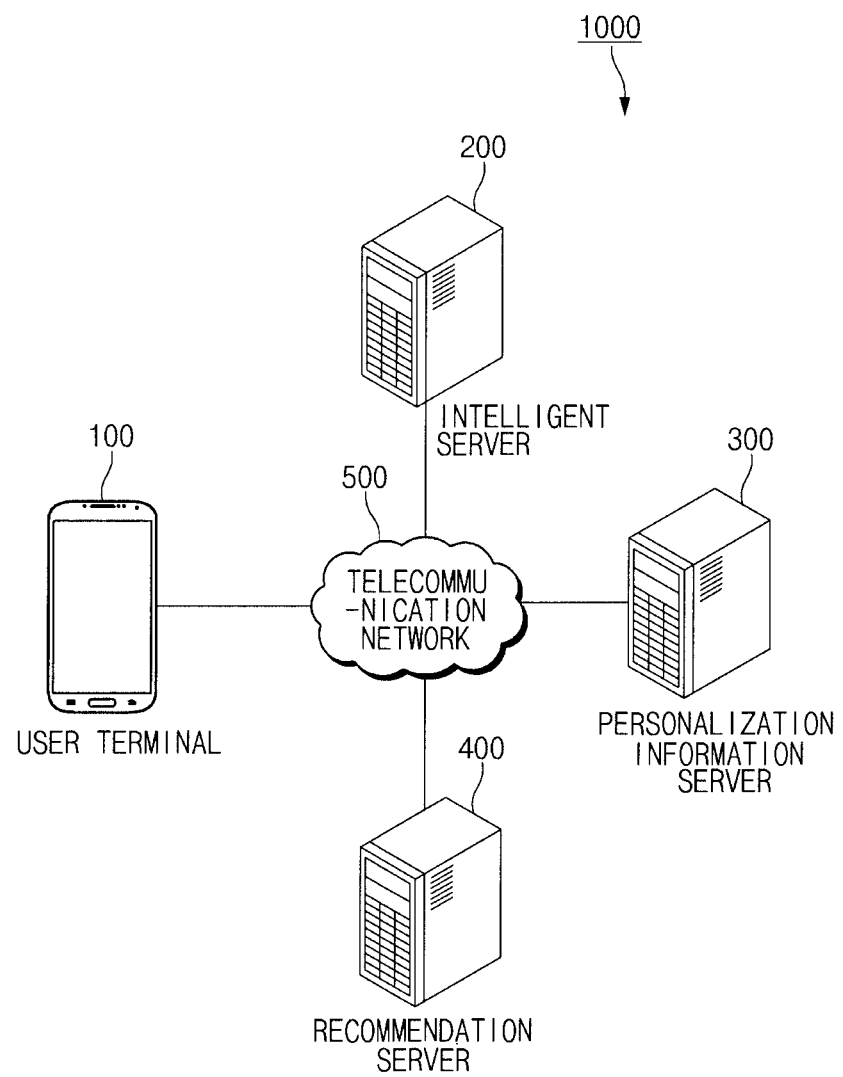
FIG. 1A is a view illustrating an integrated intelligent system, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In this disclosure, the expressions "have", "may have", "include" and "comprise", or "may include" and "may comprise" used herein indicate existence of corresponding features (e.g., components such as numeric values, functions, operations, or parts) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other components or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

Before describing various embodiments of the present disclosure, an integrated intelligent system which will be applied to various embodiments of the present disclosure will be described with reference to FIGS. 1A to 1E.

FIG. 1A is a view illustrating an integrated intelligent system, according to one embodiment.

Referring to FIG. 1A, an integrated intelligent system 1000 may include a user terminal 100, an intelligent server 200, a personalization information server 300, or a recommendation server 400.

The user terminal 100 may provide a service necessary for a user through an app (or an application program) (e.g., an alarm app, a message app, or a picture (gallery) app) stored in the user terminal 100. For example, the user terminal 100 may execute and operate other apps through an intelligent app (or a voice recognition app) stored in the user terminal 100 (as will be shown in FIG. 2). A user input may be received through the intelligent app of the user terminal 100 to launch and execute the other apps. For example, the user input may be received through a physical button, a touch pad, a voice input, a remote input, or the like. According to an embodiment, the user terminal 100 may be one of various types of terminal devices (or electronic devices), such as a mobile phone, a smartphone, personal digital assistant (PDA), or a laptop computer, which may be connected with a communications network such as the Internet.

According to an embodiment, the user terminal 100 may receive voice input serving as a user input and may create an instruction for operating an app, based on the voice input. Accordingly, the user terminal 100 may execute the app by using the instruction.

The intelligent server 200 may receive a voice input of a user from the user terminal 100 over the communication network 500 and may convert the voice input to text data. In another embodiment, the intelligent server 200 may create (or select) a path rule based on the text data (as will be shown in FIG. 5). The path rule may include information on an action (or an operation) for performing the function of an app or information on a parameter necessary to perform the action. In addition, the path rule may include the sequence of actions of the app.

The user terminal 100 may receive the path rule, may select an app depending on the path rule, and may execute an action included in the path rule in the selected app. In the present disclosure, the term of "path rule" may generally refer to, but is not limited to, the sequence of states allowing an electronic device (or a user terminal) to perform a task requested by a user. In other words, the path rule may include information on the sequence of states. The task may be, for example, a certain action which may be provided by an intelligent app. The task may create a schedule, may transmit a photo to a desired counterpart, or may provide weather information. The user terminal 100 may sequentially have at least one state (e.g., an action state of the user terminal 100.

According to an embodiment, the path rule may be provided or created by an artificial intelligent (AI) system. The AI system may be a rule-based system, or may be a neural network-based system (e.g., feedforward neural network (FNN)), or a recurrent neural network (RNN)). Alternatively, the AI system may be the combination of the rule-based system, the neural network-based system, and the recurrent neural network, and may be a different type of AI system. According to an embodiment, the path rule may be select from among the set of predefined path rules or may be created in real type in response to a user request. For example, the AI system may select at least one path rule of a plurality of predefined path rules or may create the path rule dynamically (or in real time). In addition, the user terminal 100 may employ a hybrid system to provide a path rule.

According to an embodiment, the user terminal 100 may execute the action and may display, on a display, a screen corresponding to a state of the user terminal 100 which has executed the action. For another example, the user terminal 100 may execute the action and may not display the result obtained by executing the action on the display. For example, the user terminal 100 may execute a plurality of actions and may display only the results of some of the plurality of actions on the display. For example, the user terminal 100 may display only the result, which is obtained by executing the final action, on the display. For another example, the user terminal 100 may receive the user input to display, on a display, the result obtained by executing an action at a relevant time.

The personalization information server 300 may include a database having user information. For example, the personalization information server 300 may receive the user information (e.g., context information or information on execution of an app) from the user terminal 100 and may store the user information in the database. The intelligent server 200 may be used to receive the user information from the personalization information server 300 over the communication network 500 and to create a path rule associated with the user input. According to an embodiment, the user terminal 100 may receive the user information from the personalization information server 300 over the communication network 500, and may use the user information as information for managing the database.

The recommendation server 400 may include a database storing information on an internal function of a terminal, introduction of an application, or a function to be provided to the terminal. For example, the recommendation server 400 may include a database associated with a function to be utilized by a user by receiving the user information of the user terminal 100 from the personalization information server 300. The user terminal 100 may receive information on the function to be provided from the recommendation server 400 over the communication network 500 and may provide the information for the user.

Figure 1B:
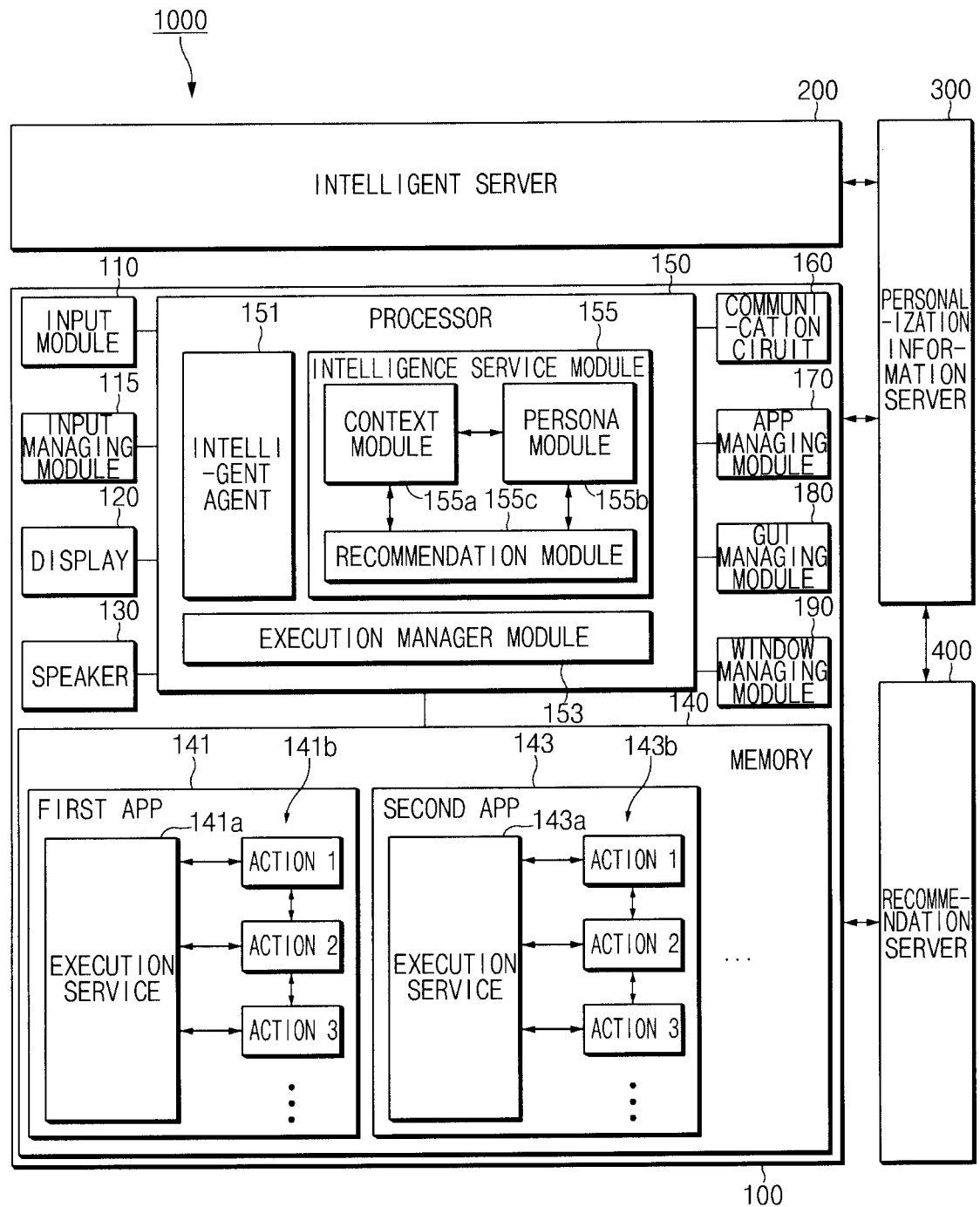
FIG. 1B is a block diagram illustrating a user terminal of an integrated intelligent system, according to an embodiment.

FIG. 1B is a view illustrating a user terminal of an integrated intelligent system, according to an embodiment.

Referring to FIG. 1B, the user terminal 100 may include an input module 110, an input managing module 115, a display 120, a speaker 130, a memory 140, a processor 150, a communication circuit 160, an app managing module 170, a GUI managing module 180, or a window managing module 190. According to an embodiment, at least some (e.g., 110, 115, 120, 130, 140, 160, 170, 180, or 190) of the user terminal 100 may be electrically connected with the processor 150. The user terminal 100 may further include a housing or components of the user terminal 100 may be seated inside the housing, or may be positioned on the housing. According to various embodiments, the user terminal 100 may be called "electronic device" and may further include components of the electronic device 1001 to be described with reference to FIG. 10. According to an embodiment, the input module 110 may receive a user input from a user. For example, the input module 110 may receive the user input from an external device (e.g., a keyboard, a mouse, a touch pad, a touch pen, or a headset) electrically connected with the input module 110. For another example, the input module 110 may include a touch screen (e.g., a touch screen display) coupled to the display 120. For another example, the input module 110 may include a hardware key (or a physical key, for example, reference numeral 112 of FIG. 1C) placed in the user terminal 100 (or the housing of the user terminal 100).

According to an embodiment, the input module 110 may include a microphone (e.g., reference numeral 111 of FIG. 1C) for receiving a voice input. For example, the input module 110 may include a speech input system and may receive the voice input through the speech input system. According to an embodiment, the microphone 111 may have at least a portion exposed through one region of the housing to receive a voice input. The microphone 111 may be controlled in the always-on form. Alternatively, the microphone 111 may be controlled to be driven as a user handles the hardware key 112 provided at one region of the user terminal 100. The handling of the user may include pressing or pressing and holding to the hardware key 112.

According to an embodiment, the input managing module 115 may manage a user input received from the input module 110. For example, the input managing module 115 may store and manage information on a generation time, a generation form (e.g., a touch, a dag, a voice, a typing, or a click) or a generation unit (e.g., a keyboard, a mouse, a touch pen, a touch pad, or voice input) of the user input.

According to an embodiment, the display 120 may display an image, a video, and/or an execution screen of an app. For example, the display 120 may display a graphic user interface (GUI) of an app. According to an embodiment, the display 120 may have at least a portion exposed through one region (e.g., a region different from the region exposing the microphone 111) of the housing to receive a touch input by a user body (e.g., a finger).

According to an embodiment, the speaker 130 may output the voice signal. For example, the speaker 130 may have at least a portion exposed through a region (e.g., a region different from the regions exposing the at least portions of the microphone 111 or the display 120) of the housing and be formed inside the user terminal 100. In addition, the speaker 130 may output a voice signal received from an external device (e.g., an intelligent server (see, reference numeral 200 of FIG. 1A). According to an embodiment, the memory 140 may store a plurality of apps (or application programs) 141 and 143. The plurality of apps 141 and 143 stored in the memory 140 may be selected, launched, and executed depending on the user input.

According to an embodiment, the memory 140 may include a database for storing information necessary to recognize the user input. For example, the memory 140 may include a log database for storing log information. For another example, the memory 140 may include a persona database for storing user information.

According to an embodiment, the memory 140 may store the plurality of apps 141 and 143, and the plurality of apps 141 and 143 may be loaded and executed. For example, the plurality of apps 141 and 143 stored in the memory 140 may be loaded and executed by an execution manager module 153 of the processor 150. The plurality of apps 141 and 143 may include execution service modules 141*a* and 143*a*. According to an embodiment, the plurality of apps 141 and 143 may execute a plurality of actions (e.g., the sequence of states) 141*b* and 143*b* through the execution service module 141*a* and 143*a* to perform the functions of the apps 141 and 143. In other words, the execution service modules 141*a* and 143*a* may be activated by the execution manager module 153 and may execute the plurality of actions 141*b* and 143*b*.

According to an embodiment, when the actions 141*b* and 143*b* of the apps 141 and 143 are executed, execution state screens obtained through the execution of the actions 141*b* and 143*b* may be displayed on the display 120. For example, the execution state screen may be a screen in a state that the actions 141*b* and 143*b* are completed. For another example, the execution state screen may be a screen in a state where the execution of the actions 141*b* and 143*b* is in partial landing (e.g., when a parameter necessary for the actions 141*b* and 143*b* are not input).

According to an embodiment, the execution service modules 141*a* and 143*a* may execute the actions 141*b* and 143*b* depending on a path rule. For example, the execution service modules 141*a* and 143*a* may be activated by the execution manager module 153, may receive an execution request from the execution manager module 153 depending on the path rule, and may execute the actions 141b and 143b depending on the execution request, thereby executing the functions of the apps 141 and 143. If the execution of the actions 141b and 143b is completed, the execution service modules 141a and 143a may transmit completion information to the execution manager module 153.

According to an embodiment, when the plurality of the actions 141b and 143b are executed in the respective apps 141 and 143, the plurality of the actions 141b and 143b may be sequentially executed. If completing the execution of one action (e.g., action 1 of the first app 141 and action 1 of the second app 143), the execution service modules 141a and 143a may open the next actions (e.g., action 2 of the first app 141 and action 2 of the second app 142) and may transmit completion information to the execution manager module 153. In this case, it is understood that opening a certain action is to change a state of the certain action to an executable state or to prepare for the execution of the certain action. In other words, if the certain action is not opened, the action may be not executed. If the completion information is received, the execution manager module 153 may transmit an execution request for the next actions (e.g., action 2 of the first app 141 and action 2 of the second app 142) to execution service modules 141a and 143a. According to an embodiment, when the plurality of apps 141 and 143 are executed, the plurality of apps 141 and 143 may be sequentially executed. For example, if receiving the completion information after the execution of the final action (e.g., action 3 of the first app 141) of the first app 141 is executed, the execution manager module 153 may transmit the execution request of the first action (e.g., action 1 of second app 143) of the second app 143 to the execution service 143a.

According to an embodiment, when the plurality of the actions 141b and 143b are executed in the apps 141 and 143, a result screen obtained through the execution of each of the executed plurality of the actions 141b and 143b may be displayed on the display 120. According to an embodiment, only some of a plurality of result screens obtained through the execution to the executed plurality of the actions 141b and 143b may be displayed on the display 120.

According to an embodiment, the memory 140 may store an intelligent app (e.g., a speech recognition app) executed in conjunction with an intelligent agent 151. The app executed in conjunction with the intelligent agent 151 may receive and process the voice input. According to an embodiment, the app executed in conjunction with the intelligent agent 151 may be executed by a specific input (e.g., an input through a hardware key, an input through a touch screen, or a specific voice input) input through the input module 110.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligent agent 151, the execution manager module 153, or an intelligent service module 155. In an embodiment, the processor 150 may operate the intelligent agent 151, the execution manager module 153, or the intelligent service module 155 by executing instructions stored in the memory 140. Modules described in various embodiments of the present disclosure may be implemented by hardware or by software. In various embodiments of the present disclosure, it is understood that the action executed by the intelligent agent 151, the execution manager module 153, or the intelligent service module 155 is an action executed by the processor 150.

According to an embodiment, the intelligent agent 151 may generate an instruction for executing an app based on the voice signal received as the user input. According to an embodiment, the execution manager module 153 may receive the generated instruction from the intelligent agent 151, and may select, launch, and execute the apps 141 and 143 stored in the memory 140. According to an embodiment, the intelligent service module 155 may manage information of the user and may use the information of the user to process the user input.

The intelligent agent 151 may transmit and process the user input received through the input module 110 to the intelligent server 200.

According to an embodiment, before transmitting the user input to the intelligent server 200, the intelligent agent 151 may pre-process the user input. According to an embodiment, to pre-process the user input, the intelligent agent 151 may include an adaptive echo canceller (AEC) module, a noise suppression (NS) module, an end-point detection (EPD) module, or an automatic gain control (AGC) module. The AEC may remove an echo from the user input. The NS module may suppress a background noise from the user input. The EPD module may detect an end-point of a user voice included in the user input to search for a portion of the user input having the user voice. The AGC module may adjust the volume of the user input such that the user input is appropriate to be recognized and processed. According to an embodiment, the intelligent agent 151 may include all the pre-processing components for performance. However, in another embodiment, the intelligent agent 151 may include some of the pre-processing components to operate at low power.

According to an embodiment, the intelligent agent 151 may include a wake up recognition module recognizing a call of a user. The wake up recognition module may recognize a wake up instruction of the user through the speech recognition module. When receiving the wake up instruction, the wake up recognition module may activate the intelligent agent 151 to receive the user input. According to an embodiment, the wake up recognition module of the intelligent agent 151 may be implemented with a low-power processor (e.g., a processor included in an audio codec). According to an embodiment, the intelligent agent 151 may be activated depending on the user input entered through a hardware key. When the intelligent agent 151 is activated, an intelligent app (e.g., a speech recognition app) executed in conjunction with the intelligent agent 151 may be executed.

According to an embodiment, the intelligent agent 151 may include a speech recognition module for performing the user input. The speech recognition module may recognize the user input for executing an action in an app. For example, the speech recognition module may recognize a limited user (voice) input (e.g., voice input such as "click" for executing a capturing action when a camera app is being executed) for executing an action such as the wake up instruction in the apps 141 and 143. For example, the speech recognition module for recognizing a user input while assisting the intelligent server 200 may recognize and rapidly process a user instruction capable of being processed in the user terminal 100. According to an embodiment, the speech recognition module for executing the user input of the intelligent agent 151 may be implemented in an app processor.

According to an embodiment, the speech recognition module (including the speech recognition module of a wake up module) of the intelligent agent 151 may recognize the user input through an algorithm for recognizing a voice. For example, the algorithm for recognizing the voice may be at least one of a hidden markov model (HMI) algorithm, an artificial neural network (ANN) algorithm, or a dynamic time warping (DTW) algorithm.

According to an embodiment, the intelligent agent 151 may change the voice input of the user to text data. According to an embodiment, the intelligent agent 151 may transmit the voice of the user to the intelligent server 200 to receive the changed text data. Accordingly, the intelligent agent 151 may display the text data on the display 120.

According to an embodiment, the intelligent agent 151 may receive a path rule from the intelligent server 200. According to an embodiment, the intelligent agent 151 may transmit the path rule to the execution manager module 153.

According to an embodiment, the intelligent agent 151 may transmit the execution result log according to the path rule received from the intelligent server 200 to the intelligent service module 155, and the transmitted execution result log may be accumulated and managed in preference information of the user of a persona module 155*b*.

According to an embodiment, the execution manager module 153 may receive the path rule from the intelligent agent 151 to execute the apps 141 and 143 and may allow the apps 141 and 143 to execute the actions 141*b* and 143*b* included in the path rule. For example, the execution manager module 153 may transmit instruction information (e.g., path rule information) for executing the actions 141*b* and 143*b* to the apps 141 and 143 and may receive completion information of the actions 141*b* and 143*b* from the apps 141 and 143.

According to an embodiment, the execution manager module 153 may transmit or receive the instruction information (e.g., path rule information) for executing the actions 141*b* and 143*b* of the apps 141 and 143 between the intelligent agent 151 and the apps 141 and 143. The execution manager module 153 may bind the apps 141 and 143 to be executed depending on the path rule and may transmit the instruction information (e.g., path rule information) of the actions 141*b* and 143*b* included in the path rule to the apps 141 and 143. For example, the execution manager module 153 may sequentially transmit the actions 141*b* and 143*b* included in the path rule to the apps 141 and 143 and may sequentially execute the actions 141*b* and 143*b* of the apps 141 and 143 depending on the path rule.

According to an embodiment, the execution manager module 153 may manage execution states of the actions 141*b* and 143*b* of the apps 141 and 143. For example, the execution manager module 153 may receive information on the execution states of the actions 141*b* and 143*b* from the apps 141 and 143. For example, when the execution states of the actions 141*b* and 143*b* are in partial landing (e.g., when a parameter necessary for the actions 141*b* and 143*b* are not input), the execution manager module 153 may transmit information on the partial landing to the intelligent agent 151. The intelligent agent 151 may requests for an input of necessary information (e.g., parameter information) by the user using the received information. For another example, when the execution states of the actions 141*b* and 143*b* are operating states, the voice input may be received from the user, and the execution manager module 153 may transmit information on the apps 141 and 143 being executed and the execution states of the apps 141 and 143 to the intelligent agent 151. The intelligent agent 151 may receive parameter information of the voice input through the intelligent server 200 and may transmit the received parameter information to the execution manager module 153. The execution manager module 153 may change a parameter of each of the actions 141*b* and 143*b* to a new parameter by using the received parameter information.

According to an embodiment, the execution manager module 153 may transmit the parameter information included in the path rule to the apps 141 and 143. When the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the voice input of the user. For example, when the voice input specifies the app 141 executing a portion of the action 141*b* but does not specify the app 143 executing remaining actions 143*b*, the execution manager module 153 may receive a plurality of different path rules in which the same app 141 (e.g., an gallery app) executing the portion of the action 141*b* is executed and in which different apps 143 (e.g., a message app or a Telegram app) executing the other action 143*b*. For example, the execution manager module 153 may execute the same actions 141*b* and 143*b* (e.g., the same successive actions 141*b* and 143*b*) of the plurality of path rules. When the execution manager module 153 executes the same action, the execution manager module 153 may display, on the display 120, a state screen for selecting the different apps 141 and 143 included in the plurality of path rules.

According to an embodiment, the intelligent service module 155 may include a context module 155*a*, a persona module 155*b*, or a recommendation module 155*c*.

The context module 155*a* may collect current states of the apps 141 and 143 from the apps 141 and 143. For example, the context module 155*a* may receive context information indicating the current states of the apps 141 and 143 to collect the current states of the apps 141 and 143.

The persona module 155*b* may manage personal information of the user utilizing the user terminal 100. For example, the persona module 155*b* may collect the usage information and the execution result of the user terminal 100 to manage personal information of the user.

The recommendation module 155*c* may predict the intent of the user to recommend an instruction to the user. For example, the recommendation module 155*c* may recommend an instruction to the user by taking into consideration the current state (e.g., a time, a place, context, or an app) of the user.

According to an embodiment, the communication circuit 160 (or a communication module or a communication interface) may establish wired communication or wireless communication based on a specified protocol with at least one external device (e.g., the intelligent server 200, the personalization information server 300, or the recommendation server 400) inside the integrated intelligent system 1000. The communication circuit 160 may transceive information with the at least one external device through the wired communication or wireless communication.

According to an embodiment, the app managing module 170 may manage information associated with at least one app (e.g., the first app 141 and/or the second app 143) on the memory 140. For example, the app managing module 170 may manage information (e.g., information on the type, the version, or the installation of the app) on the attribute of the app, information on the execution state of the app, operation information (e.g., content output information or sound output information) resulting from the execution of the app, or the state information (e.g., information on a foreground state or a background state) resulting from the execution of the app.

According to an embodiment, when the user terminal 100 is connected with the external device including the display (or the screen) electrically or through communication, a graphic user interface (GUI) managing module 180 may transform window information (e.g., an app execution screen) (or, a user interface) for at least one app (e.g., the first app 141 and/or the second app 143), which is executing in the user terminal 100, to correspond to a display output format (e.g., the size, the ration, or the resolution of the output window) of the external device and may transmit the transformed information to the external device. In addition, the GUI managing module 180 may receive window information for at least one app, which is executing, from the external device and may transform the window information to correspond to the output format of the display 120.

According to an embodiment, the window managing module 190 may manage the window information (e.g., an app execution screen) for at least one app (e.g., the first app 141 and/or the second app 143) executed in the user terminal 100. For example, the window managing module 190 may store and manage information on the output size, the output period, the output coordinates or the output resolution of the window corresponding to each of at least one app.

According to various embodiments, the function of at least one of the input managing module 115, the app managing module 170, the GUI managing module 180, or the window managing module 190, which are described above, will be performed by another component (e.g., the processor 150) of the user terminal 100.

Figure 1C:
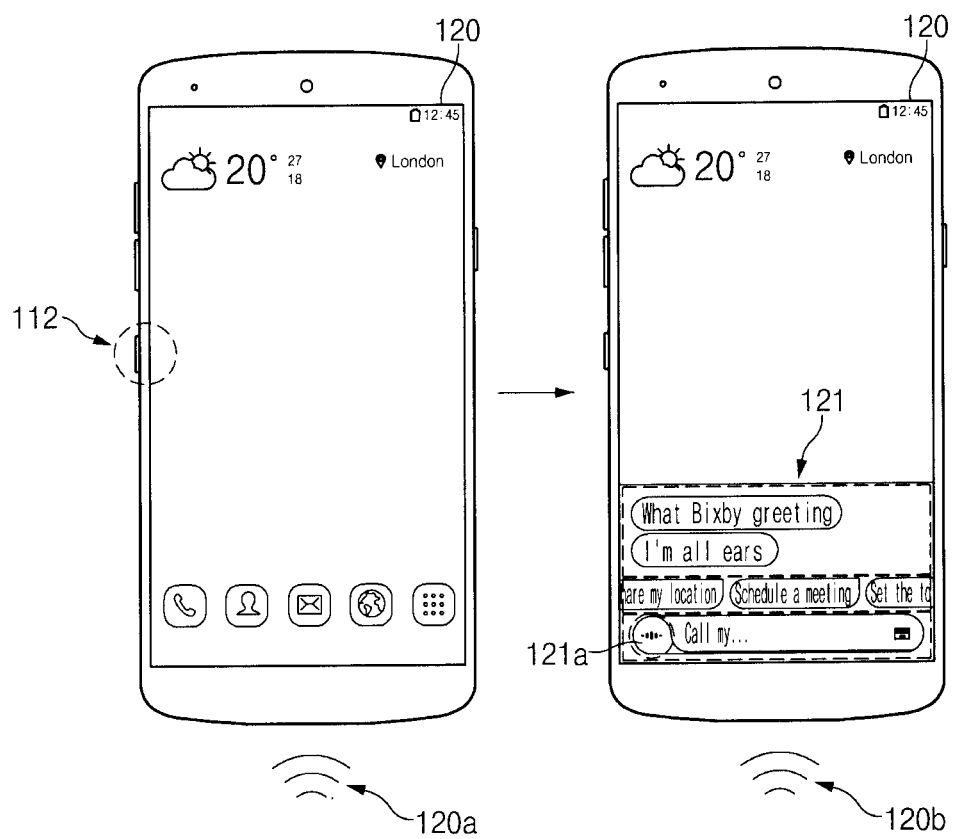
FIG. 1C is view illustrating that an intelligent app of a user terminal is executed, according to an embodiment.

FIG. 1C is view illustrating that an intelligent app of a user terminal is executed, according to an embodiment.

Referring to FIG. 1C, the user terminal 100 receives a user input to execute an intelligent app (e.g., a speech recognition app) executed in conjunction with the intelligent agent 151. According to an embodiment, the user terminal 100 may execute the intelligent app for recognizing a voice through a hardware key 112. When the user terminal 100 receives the user input through the hardware key 112, the user terminal 100 may display a UI 121 of the intelligent app on the display 120. For example, a user may touch a speech recognition button 121*a* on the UI 121 of the intelligent app to enter a voice 120*a* in a state where the UI 121 of the intelligent app is displayed on the display 120. For another example, while continuously pressing the hardware key 112 to enter the voice input 120*a*, the user may enter the voice 1120*a*.

According to an embodiment, the user terminal 100 may execute the intelligent app for recognizing a voice through the microphone 111. For example, when a specified voice (e.g., wake up!) is input 116*a* through the microphone 111, the user terminal 100 may display the UI 121 of the intelligent app on the display 120.

Figure 1D:
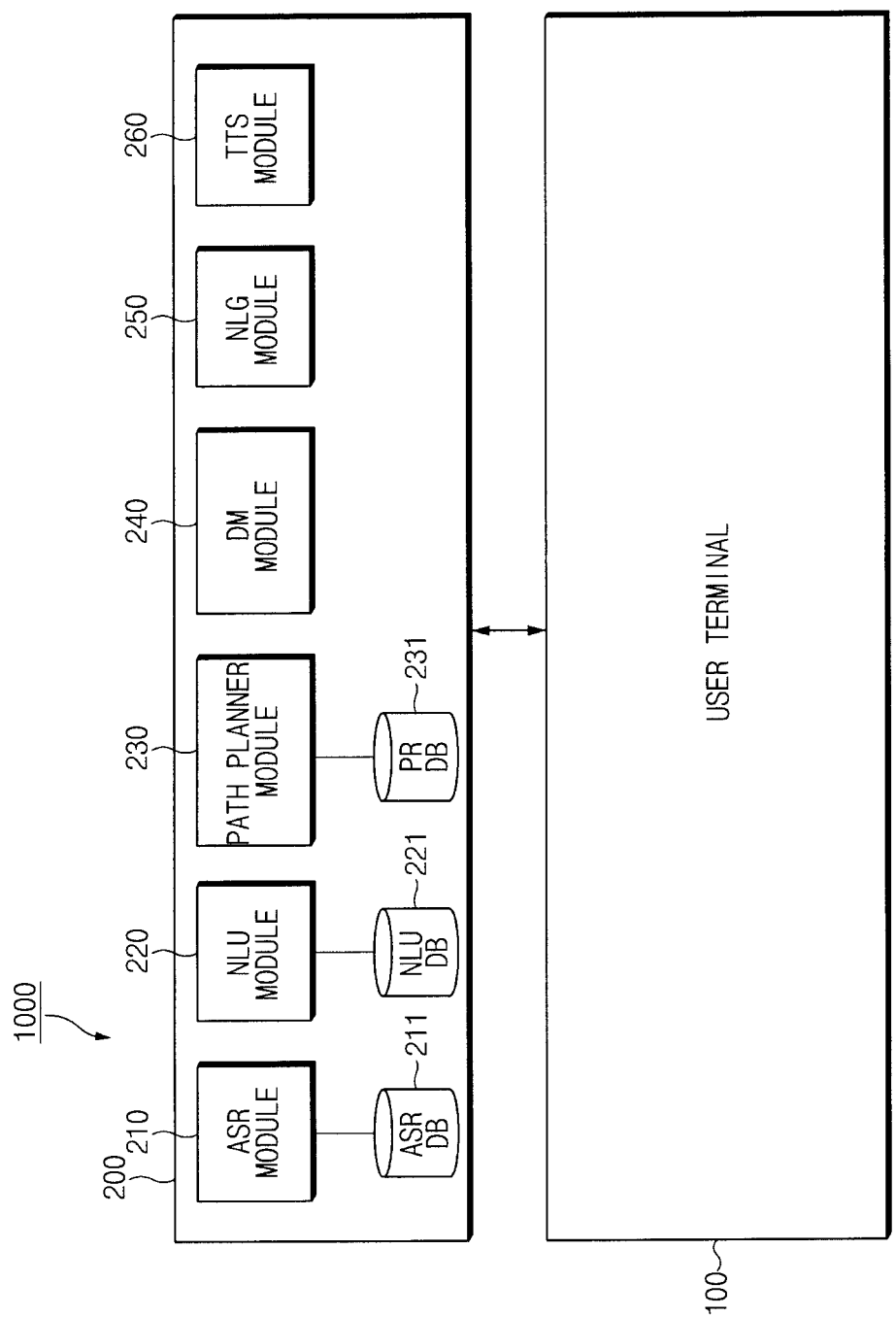
FIG. 1D is a block diagram illustrating an intelligent server of an integrated intelligent system, according to an embodiment.

FIG. 1D is a view illustrating an intelligent server of an integrated intelligent system, according to an embodiment.

Referring to FIG. 1D, the intelligent server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to various embodiments, at least some (210, 220, 230, 240, 250 or 260) of the intelligent server 200 may be implemented separately from each other or at least partially integrally with each other. According to an embodiment, the intelligent server 200 may include a controller (or a processor) to control the overall functional actions of the components (e.g., 210, 220, 230, 240, 250, or 260), a storage device (or a memory) coupled to the controller, or a communication interface (or a communication circuit) to support the connection of the communication network (see, 500 of FIG. 1A).

The NLU module 220 or the path planner module 230 of the intelligent server 200 may generate a path rule.

According to an embodiment, the ASR module 210 may change the user input received from the user terminal 100 to text data. For example, the ASR module 210 may include an voice recognition module. The voice recognition module may include an acoustic model and a language model. For example, the acoustic model may include information associated with voice, and the language model may include unit phoneme information and information on a combination of unit phoneme information. The voice recognition module may change voice input to text data by using the information associated with voice input and unit phoneme information. For example, the information on the acoustic model and the language model may be stored in an automatic speech recognition database (ASR DB) 211.

According to an embodiment, the NLU module 220 may detect user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. Accordingly, the NLU module 220 may obtain a domain, intent, or a parameter (or a slot) necessary for the user input to express the intent.

According to an embodiment, the NLU module 220 may determine the intent of the user and a parameter by using a matching rule classified in terms a domain, a intent, and a parameter (or a slot) necessary to detect the intent. For example, one domain (e.g., an alarm) may include a plurality of intents (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may detect the meaning of words extracted from a user input by using linguistic features (e.g., grammatical elements) such as morphemes, phrases, and the like and may match the meaning of the detected words to the domain and the intent to determine user intent. For example, the NLU module 220 may calculate the number of words, which have been extracted from the user input and included in each of the domain and the intent, to determine the user intent. According to an embodiment, the NLU module 220 may determine a parameter of the user input by using the words that are the basis for detecting the intent. According to an embodiment, the NLU module 220 may determine the user intent by using the NLU DB 221 storing the linguistic features for detecting the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information on the app to be executed, the action (e.g., at least one state) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter to generate one path rule or a plurality of path rules. For example, the NLU module 220 may arrange the app to be executed and the action to be executed in the app by using information of the user terminal 100 depending on the intent of the user input in the form of ontology or a graph model to generate the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the plurality of path rules which are generated. For example, the NLU module 220 may select an optimal path rule of the plurality of path rules. For another example, when only a portion of action is specified based on the voice input, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a portion of an action is specified based on the voice input, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligent agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter to generate the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent detected by the NLU module 220 is clear. For example, the DM module 240 may determine whether the user intent is clear, based on whether the information of a parameter is sufficient. The DM module 240 may determine whether the parameter detected by the NLU module 220 is sufficient to perform a task. According to an embodiment, when the user intent is not clear, the DM module 240 may perform a feedback for making a request for necessary information to the user. For example, the DM module 240 may perform a feedback for making a request for information on the parameter for detecting the user intent.

According to an embodiment, the DM module 240 may include a content provider module. When the content provider module executes an action based on the intent and the parameter detected by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the natural language generating module NLG 250 may change specified information to a text form. Information changed to the text form may be a form of a natural language voice. For example, the specified information may be information on an additional input, information for guiding the completion of an action corresponding to the user input, or information for guiding the additional input of the user (e.g., feedback information on the user input). The information changed to the text form may be displayed on the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. Accordingly, the generated response may be transmitted to the user terminal 100.

Figure 1E:
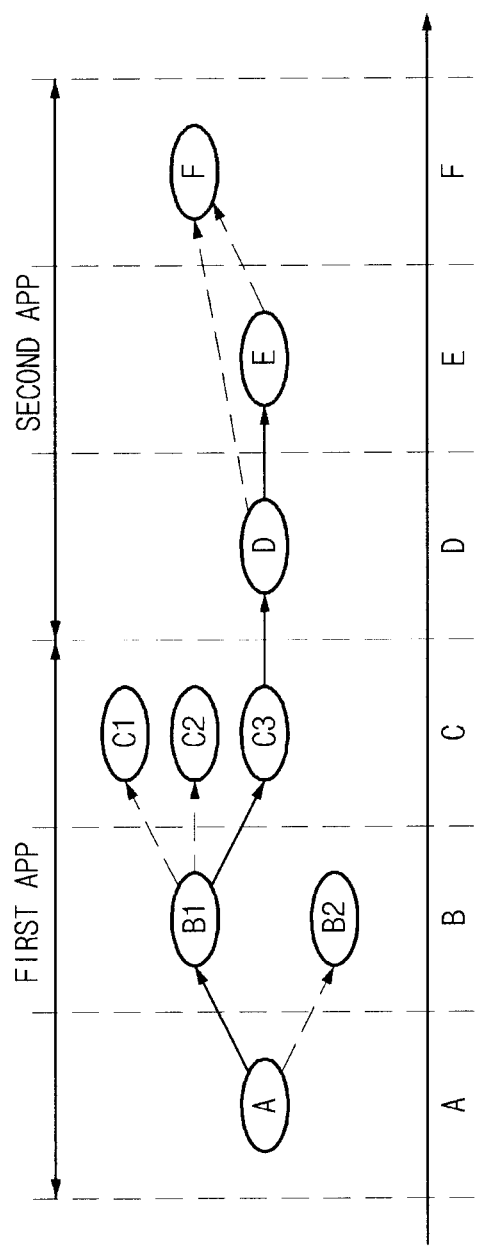
FIG. 1E is a diagram illustrating a method for generating a path rule in the intelligent server, according to an embodiment of the present disclosure.

FIG. 1E illustrates the creation of a path rule of the intelligent server, according to an embodiment.

Referring to FIG. 1E, according to an embodiment, the NLU module 220 may divide the function of an app into at least one action (e.g., states A to F) and may store the at least one action in the PR DB 231. For example, the NLU module 220 may store a path rule set, which includes a plurality of path rules A-B1-C1, A-B1-C2, A-B1-C3-D-F, and A-B1-C3-D-E-F divided into at least one action (e.g., a state), in the PR DB 231.

According to an embodiment, the PR DB 231 of the path planner module 230 may store the path rule set for performing the function of an app. The path rule set may include a plurality of path rules each of which includes a plurality of actions (e.g., the sequence of states). An action executed depending on a parameter input to each of the plurality of actions may be sequentially arranged in the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, when there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 to transmit the selected one path rule to the user terminal 100.

According to another embodiment, the NLU module 220 may determine the intent of a user and the parameter corresponding to the user input (e.g., an input for selecting C3) additionally entered by the user terminal 100 to transmit the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

Accordingly, the user terminal 100 may complete the actions of the apps 141 and 143 based on the selected one path rule.

According to an embodiment, when a user input in which information is insufficient is received by the intelligent server 200, the NLU module 220 may generate a path rule partly corresponding to the received user input. For example, the NLU module 220 may transmit the partly corresponding path rule to the intelligent agent 151. The intelligent agent 151 may transmit the partly corresponding path rule to the execution manager module 153, and the execution manager module 153 may execute the first app 141 depending on the path rule. The execution manager module 153 may transmit information on an insufficient parameter to the intelligent agent 151 while executing the first app 141. The intelligent agent 151 may make a request for an additional input to a user by using the information on the insufficient parameter. If the additional input is received by the user, the intelligent agent 151 may transmit and process the additional input to the intelligent server 200. The NLU module 220 may generate a path rule to be added, based on the intent of the user input additionally entered and parameter information and may transmit the path rule to be added, to the intelligent agent 151. The intelligent agent 151 may transmit the path rule to the execution manager module 153 and may execute the second app 143.

According to an embodiment, when a user input, in which a portion of information is missed, is received by the intelligent server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a portion of an action is missed, by using the user information. Accordingly, even though the user input in which a portion of information is missed is received by the intelligent server 200, the NLU module 220 may make a request for the missed information to receive an additional input or may determine a path rule corresponding to the user input by using user information.

Following table 1 may show an exemplary form of the path rule associated with the task requested by the user, according to an embodiment.

TABLE 1

| Path rule ID | State | parameter |
|---|---|---|
| Gallery_101 | pictureView(25) | NULL |
| | searchView(26) | NULL |
| | searchViewResult(27) | Location, time |
| | SearchEmptySelectedView(28) | NULL |
| | SearchSelectedView(29) | ContentType, selectall |
| | CrossShare(30) | anaphora |

Referring to FIG. 1, a path rule created or selected by the intelligent server (intelligent server 200 of FIG. 1) based on the voice input (e.g., "Please, let me share your photo") may include at least one state 25, 26, 27, 28, 29, or 30. For example, the at least one state (e.g., one operation state of the terminal) may correspond to at least one of photo application execution (PicturesView) 25, photo search function execution (SearchView) 26, search result display screen output (SearchViewResult) 27, screen output (SearchEmptySelectedView) 28 for the display of a search result in which a photo is not selected, screen output (SearchSelectedView) 29 for the display of a search result in which at least one photo is selected, or share application selection screen output (CrossShare) 30.

According to an embodiment, parameter information of the path rule may correspond to at least one state. For example, the parameter information may be included in the screen output (SearchSelectedView) 29 for the display of a search result in which at least one photo is selected, As the path rule including the sequence of the states 25, 26, 27, 28, and 29 is performed, the task (e.g., "Please, let me share your photo") requested by the user may be performed.

For example, at least some of the integrated intelligent system (see, reference numeral 1000 of FIG. 1A) may perform a series of process to provide a service based on voice recognition. For example, the user terminal (see, reference numeral 100 of FIG. 1B) may receive a user input (e.g., a voice input) based on voice input and may transmit relevant data to the intelligent server (see, reference numeral 100 of FIG. 1D). The intelligent server 200 may create (or, select) a path rule based on data associated with the user input. The user terminal 100 may receive the path rule from the intelligent server 200 to perform the path rule (e.g., perform at least one operation included in the path rule), thereby performing the task corresponding to the voice input (e.g., control the functional action of a specific app).

Figure 2A:
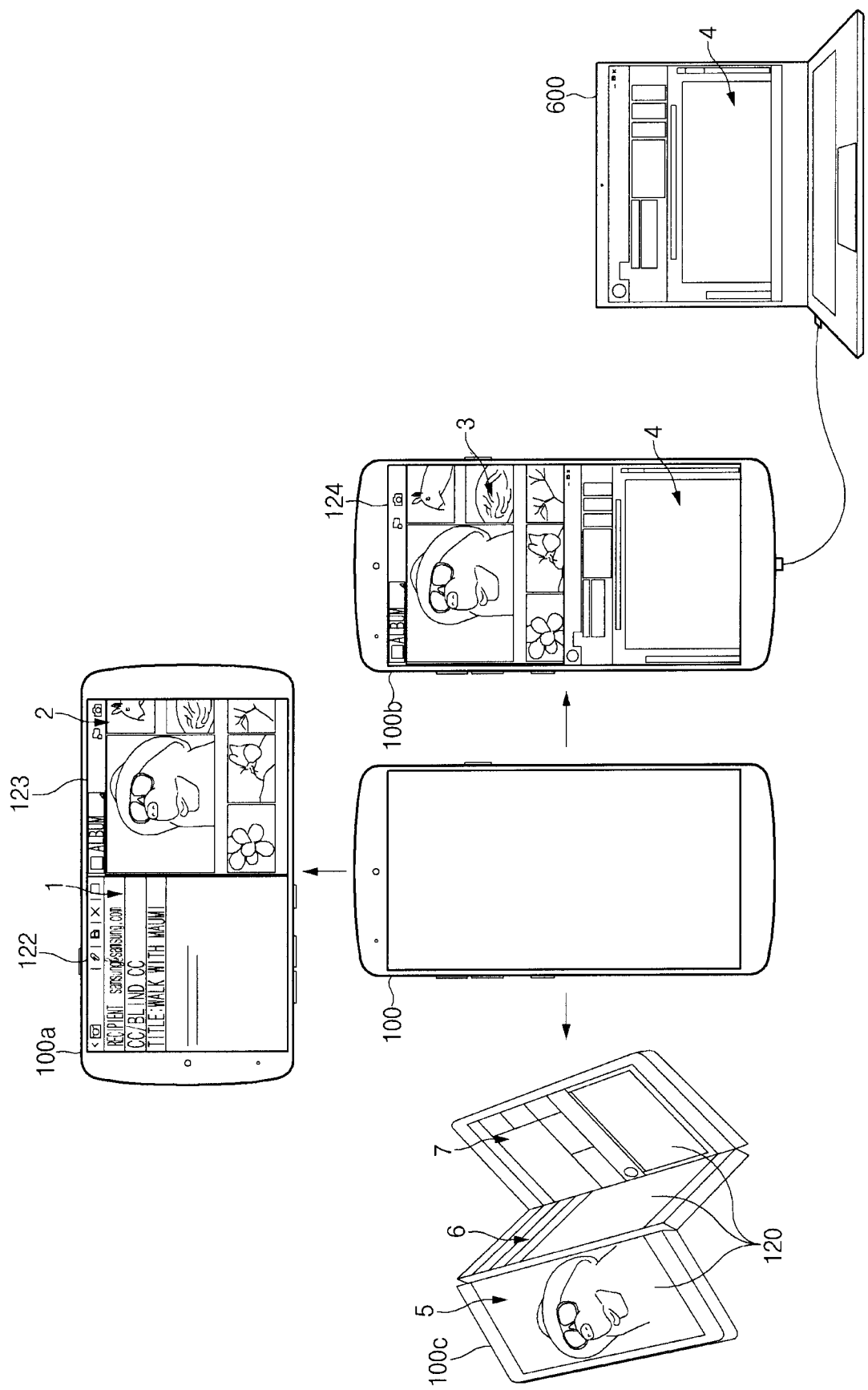
FIG. 2A is a view illustrating a multitasking operation environment of a user terminal, according to an embodiment.
Figure 2B:
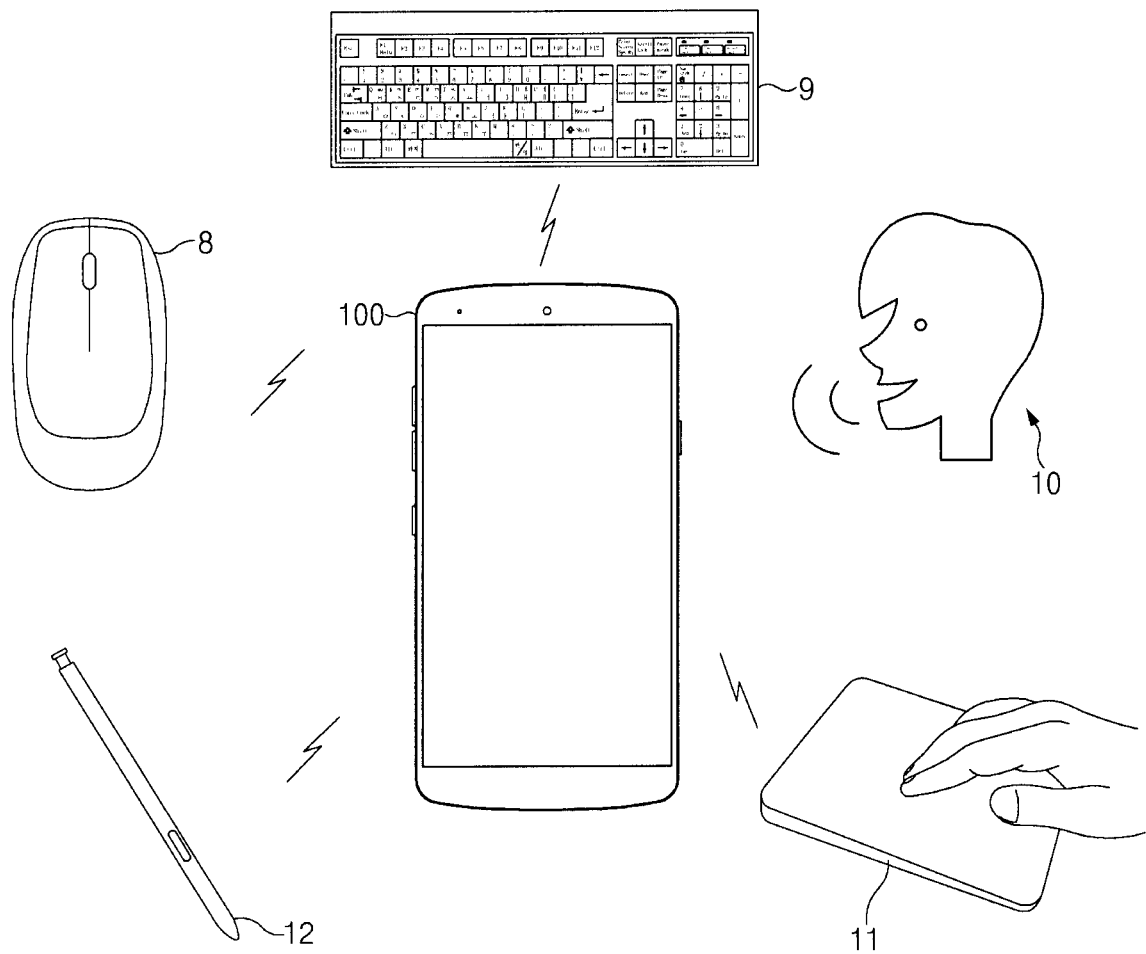
FIG. 2B is a view illustrating a multimodal interface operation environment of the user terminal, according to an embodiment.
Figure 2C:
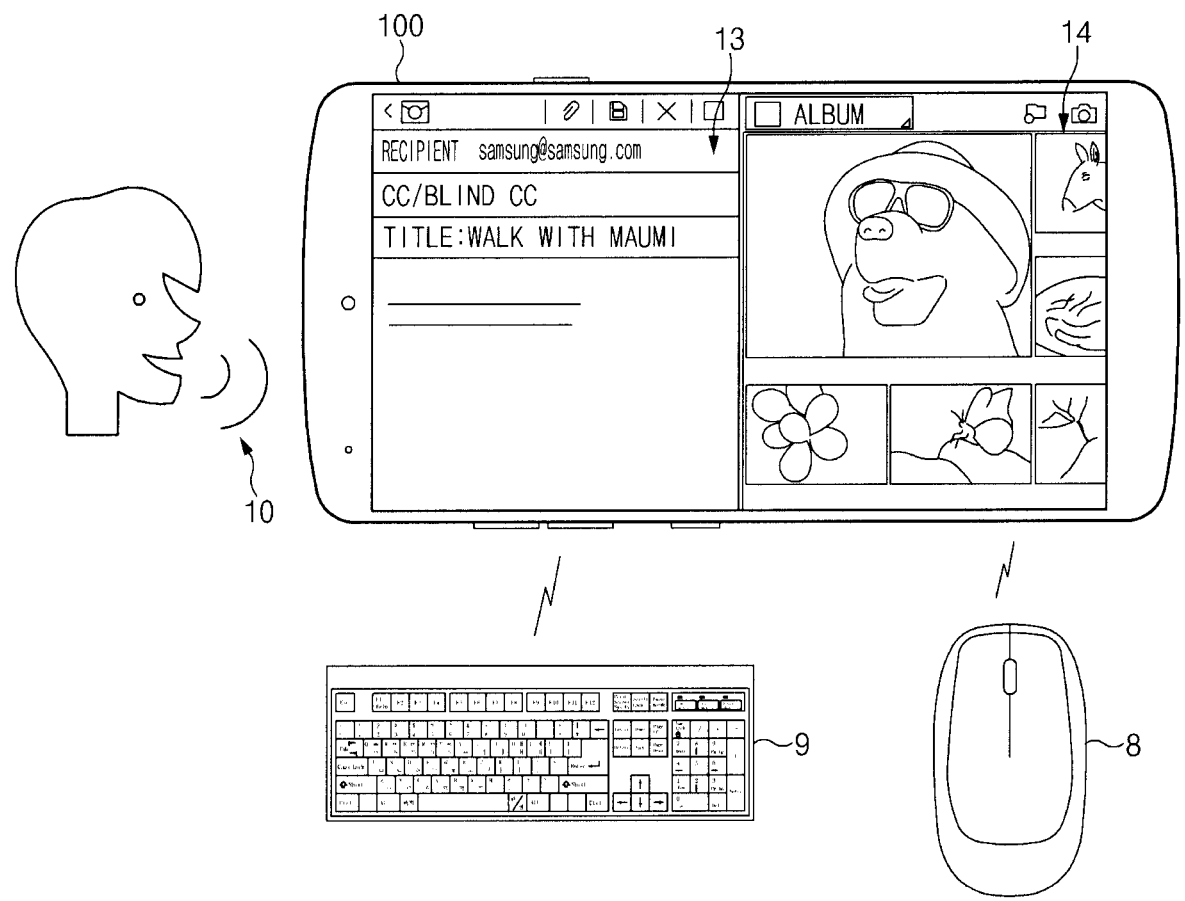
FIG. 2C is a view illustrating a complex operation environment of a multitasking environment and a multimodal interface environment in the user terminal, according to an embodiment.

FIGS. 2A and 2B are views illustrating a multitasking operating environment and a multimodal interface operating environment of a user terminal, according to an embodiment. FIG. 2C is a view illustrating a complex operation environment of a multitasking environment and a multimodal interface environment in a user terminal, according to an embodiment.

Referring to FIG. 2A, according to various embodiments, the user terminal 100 may support a multitasking environment of executing a plurality of apps at the same time and of outputting windows (e.g., app execution screens or user interfaces) made according to the execution of the apps.

Regarding the creation of the multitasking environment, according to a first embodiment, a user terminal 100a splits or divides a screen region of a display (see reference numeral 120 of FIG. 1B) into a plurality of regions and may support a screen split function for executing mutually different apps at the same time in the split regions. For example, the user terminal 100a may split the screen region of the display 120 into a first region 122 and a second region 123 and may output, to the respective regions 122 and 123, a first window 1 and a second window 2 made according to the execution of a plurality of apps, which are mounted or installed in the user terminal 100a. According to an embodiment, the window (e.g., reference numeral 1 or 2) may be output in size (or ratio) corresponding to a whole area of the split region (e.g., 122 or 123) of the display 120 or may output in size corresponding to a partial area of the split region 122 or 123. In addition, the window (e.g., 1 or 2) may be varied in size under user control (e.g., the handling of a size regulating tap provided at one region of the window or dragging for an edge region of the window).

According to another embodiment, a user terminal 100b may support a side sync function of executing at least one app mounted or installed therein and at least one app mirrored from an external device at the same time. In this regard, the user terminal 100b and an external device 600 (e.g., an external device equipped with a display) may be electrically or operatively connected with each other through a cable (e.g., a USB cable) or wireless communication (e.g., WiFi or Bluetooth). The external device 600 may perform mirroring for an app which is executing therein. Accordingly, in another embodiment, a first window 3, which is made according to the execution of the mounted or installed app, and a second window 4, which is made for the app mirrored from the external device 600, may be output on a screen region 124 of the display 120 of the user terminal 100b. The first window 3 and the second window 4 may be output in equal areas on the screen region 124 or may be output while being partially overlapped with each other. The first window 3 and the second window 4 may be varied in size. According to an embodiment, the side sync function may support a mobile desk top environment by mirroring an app, which is executing on the user terminal 100b, to the external device 600. In this case, the external device 600 may output the first window 3 and the second window 4, which are made according to the execution of the apps. In addition, when the user terminal 100b executes the mirroring, the user terminal 100b may perform the mirroring based on a connection with an additional external device (e.g., Samsung DeX Station) supporting the internetworking with the external device 600, as well as based on a cable or wireless communication.

According to another embodiment, a user terminal 100c may include a plurality of displays 120 to support a multi-screen function of simultaneously executing mutually different apps in respective display regions. Accordingly, when a plurality apps mounted or installed in the user terminal 100c are simultaneously executed, a first window 5, a second window 6, and a third window 7, which are made according to the execution of the apps, may be output to the respective display regions. According to an embodiment, the number of windows to be output to a certain display 120 may be plural depending on the number of apps executed in the user terminal 100c.

Referring to FIG. 2B, the user terminal 100 may support a multimodal interface environment in which various types of user inputs are simultaneously generated. For example, the user terminal 100 may support a user input (e.g., a click input, a drag input, or a typing input) based on an input device (e.g., a mouse 8 and a keyboard 9) transmitting or receiving a signal or data to or from the user terminal 100 through a cable or wireless communication. In addition, the user terminal 100 may receive a voice input 10 from a microphone (see reference numeral 111 of FIG. 1C) mounted in the user terminal 100. In addition, the user terminal 100 may receive a user input (e.g., a touch input or a drag input) based on detecting the variation in an electrical characteristic by a user body (e.g., a finger) or an input device (e.g., a touch pad 11, a touch pen 12, or a touchscreen display).

According to various embodiments, functions (e.g., a screen split function, a side sync function, or a multiscreen function) or input manners (e.g., a touch input, a drag input, a click input, a typing input, or a voice input), which are related to the multitasking environment or the multimodal interface environment of the user terminal 100, are not limited to the above, but may be variously employed as long as a plurality of apps are simultaneously executed or a plurality of input manners are simultaneously employed.

Referring to FIG. 2C, the user terminal 100 may support the complex operation of the multitasking environment and the multimodal interface environment described above. According to an embodiment, the user terminal 100 may execute a plurality of apps based on the screen split function, the side sync function, or the multiscreen function in association with the operation of the multitasking environment, and may output windows 13 and 14, which are associated with the executions of the apps, on screen regions of a display (see reference numeral 120 of FIG. 1B). According to various embodiments, the windows 13 and 14 illustrated in FIG. 2C may be associated with the execution of an app mounted or installed in the user terminal 100 or at least one of the windows 13 and 14 may be associated with an app mirrored from an external device interacting with the user terminal 100.

The user terminal 100 may operate the multitasking environment while operating the multimodal interface environment to simultaneously support various input manners, such that the execution of the apps is controlled or inputs are applied to the windows 13 and 14. For example, the user terminal 100 may apply a click input or a typing input of a user, which is generated through the mouse 8 or the keyboard 9, respectively, to a first window 13 for a first app (e.g., an e-mail app). Simultaneously, the user terminal 100 may control the functional action of a second app (e.g., an album app) corresponding to the voice input 10. By way of the control for the functional action of the second app, the user terminal 100 may analyze the voice input 10 (e.g., "Please, attach a photo captured yesterday to my e-mail") to display the photo corresponding to the voice input 10 on a second window 14 of the second app and to attach the photo to the first window 13.

According to an embodiment, under the complex operation environment of the multitasking environment and the multimodal interface environment, the states (e.g., a foreground state or a background state) of the windows 13 and 14, which are output, may be associated with the generated user inputs. In this regard, the foreground state of a window may refer to a state in which an output window is focused to allow a user to apply a user input. Accordingly, at least one of the windows, which are being output, may be understood as being in the background state except for the window in the foreground state. The background state may refer to a state in which a window prevents the user from applying a user input or a state in which the user input is not applied. Regarding the operation of the first app (e.g., an email-app), when a user input (e.g., a click input based on the mouse 8 or a typing input based on the keyboard 9) is generated, the user terminal 100 (or a processor (see 150 of FIG. 1B)) may control a window (e.g., reference numeral 13) associated with the first app such that the window is in the foreground state (or focused). Accordingly, at least one of the windows, which are being output, may be controlled to be in the background state (or unfocused), except for the window 13 associated with the first app. In other words, the user terminal 100 may control a window of an app, which receives a user input, of a plurality of apps, which are executing, such that the window is in the foreground state and may control a window of at least one of remaining apps such that the window is in the background state. According to various embodiments, the foreground state or the background state of the window may be understood as a foreground state or a background state of the relevant app.

As described above, when a plurality of user inputs are simultaneously generated, or within a specified proximity in time, in the operation of controlling the windows of the apps, which are executing, to be in the foreground state or the background state, the states of the windows are changed. For example, in the state that the window (e.g., reference numeral 13) of the first app is controlled to be in the foreground state as the click input based on the mouse 8 or the typing input based on the keyboard 9 is generated with respect to the first app, a voice input 10 may be generated with respect to the second app associated with the window (e.g., reference numeral 14) in the background state. In this case, the window (e.g., reference numeral 13) in the foreground state and the window (e.g., reference numeral 14) in the background state may be changed to be in the background state and the foreground state, respectively. This may be based on a series of processes in which the user terminals 100 performs a path rule by identifying an app (e.g., the second app) corresponding to the voice input 10 based on the path rule received from the intelligent server (see, reference numeral 200 of FIG. 1D), when processing the voice input 10. As described above, the change in the states of the windows by a plurality of user inputs might not be made according to the intent of a user to operate a plurality of apps. For example, although the user intends to control the function of the second app through the voice input 10 while continuously applying the user input based on the mouse 8 or the keyboard 9 to the first app, as the window (e.g., 14) of the second app is changed to be in the foreground state during processing of the voice input 10, the user input based on the mouse 8 or the keyboard 9 might not be applied to the first app, because the first app is changed to be in the background state. Moreover, the user input based on the mouse 8 or the keyboard 9 may be inadvertently applied to the second app, because the second app is in the foreground state.

Hereinafter, description will be made regarding various embodiments of controlling the change in the states of windows associated with the execution of a plurality of apps, based on whether a specific condition is satisfied with respect to the apps, which are executing, under the complex operation environment of the multitasking environment and the multimodal interface environment supporting the user terminal 100.

Figure 3:
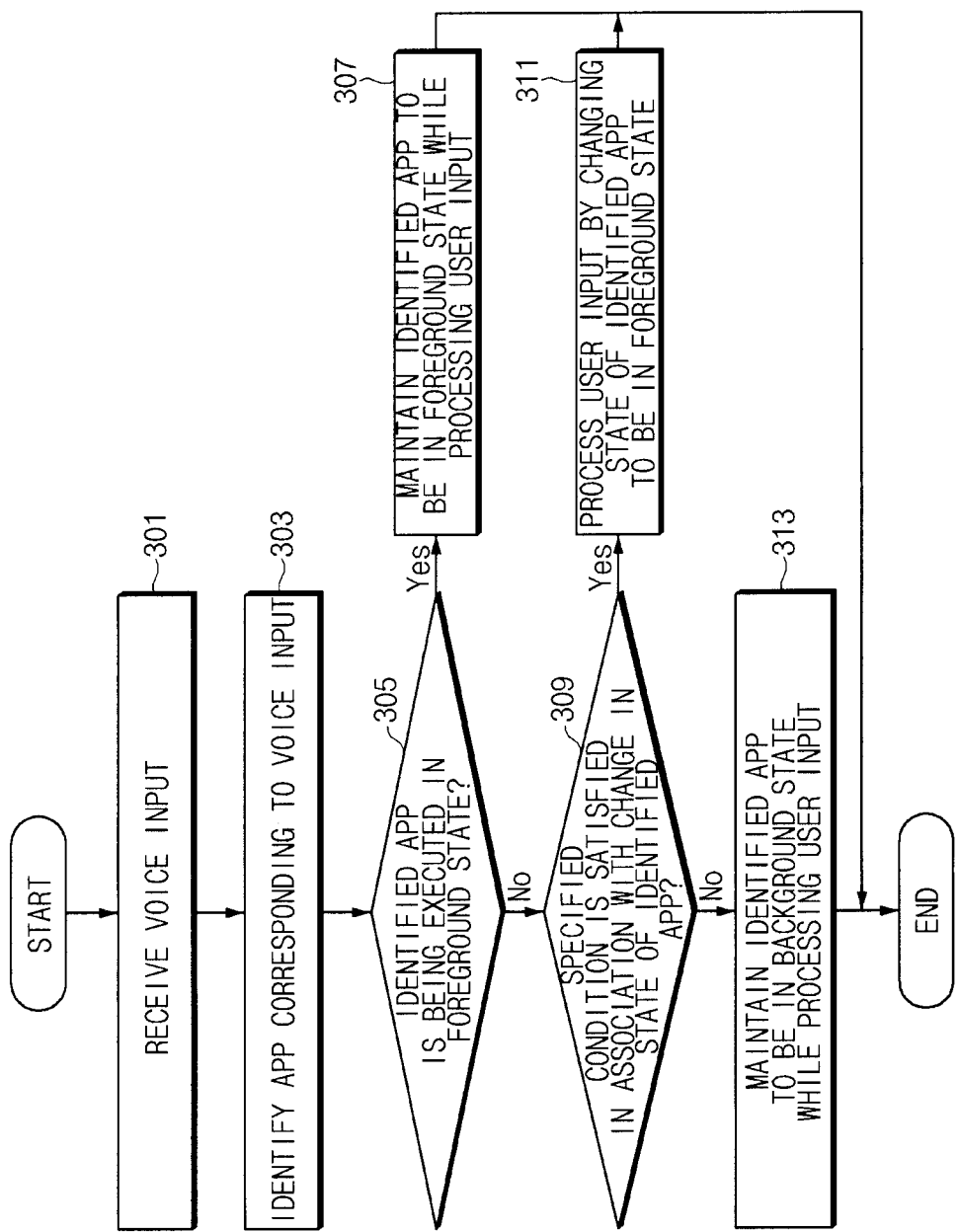
FIG. 3 is a view illustrating a method of processing a user input of the user terminal, according to an embodiment.

FIG. 3 is a view illustrating a method of processing a user input of the user terminal, according to an embodiment. At least one operation described made with reference to FIG. 3 may be, for example, performed on the assumption that windows associated with a plurality of apps are output as a user terminal executes the apps.

In operation 301, an intelligent agent (see, reference numeral 151 of FIG. 1B) of a user terminal (see, reference numeral 100 of FIG. 1B) may receive a voice input including a specific command or intent associated with the control of a functional action of a first app of a plurality of apps which are executing. For example, the user terminal may receive a first user input generated through a microphone (see, reference numeral 111 of FIG. 1C) activated in response to the handling (e.g., pressing or pressing and holding) of a hardware key (see, reference numeral 112 of FIG. 1C) by a user and may transmit data associated with the first user input to the intelligent server (see, reference numeral 200 of FIG. 1D).

In operation 303, a processor (see, reference numeral 150 of FIG. 1B) of the user terminal may identify the first app associated with the voice input. In this regard, an intelligent agent may receive a path rule corresponding to the voice input from the intelligent server and may transmit the path rule to an execution manager module (see, reference numeral 153 of FIG. 1B). The execution manager module may determine an app associated with the path rule, based on information on at least one action or information on at least one parameter associated with the execution of the action which is included in the path rule. The processor may identify the first app corresponding to the voice input based on the determination of the app by the execution manager module. Thereafter, the processor may acquire at least one pieces of information on the first app identified from an app managing module (see, reference numeral 170 of FIG. 1B).

In operation 305 and operation 307, the processor may determine whether the first app (or a window output as the first app is executed) is in the foreground state or background state, based on at least one piece of information on the first app. According to an embodiment, when the first app is being executed in the foreground state, the processor may process the voice input (e.g., may execute a path rule) with respect to the first app in the foreground state without separately controlling the apps which are executing.

When the first app in the background state, in operation 309, the processor may determine whether the state of the first app is to be changed (or whether the states of the apps are changed), when processing the voice input. For example, the processor may determine, in the operation of processing the voice input, whether at least one specific condition is satisfied, and may control the change in the state of the first app based on the determination result. According to an embodiment, the at least one condition may include a condition that a second user input is not generated with respect to another of the apps, which are executing, except for the first app during the time in which the first user input is generated. According to various embodiments, the at least one condition may include a condition that a specific display object (e.g., icon) is not included in the window output as the first app is executed, a condition that at least one of second apps is not included in a specific app list, or a condition that an additional information input of a user is requested in association with processing the first user input.

According to an embodiment, when at least one of the conditions is satisfied, the processor may process the first user input by changing the first app in the background state to be in the foreground state in operation 311. Alternatively, when any one of the conditions is not satisfied, the processor may maintain the first app to be in the background state while processing the first user input in operation 313.

Figure 4A:
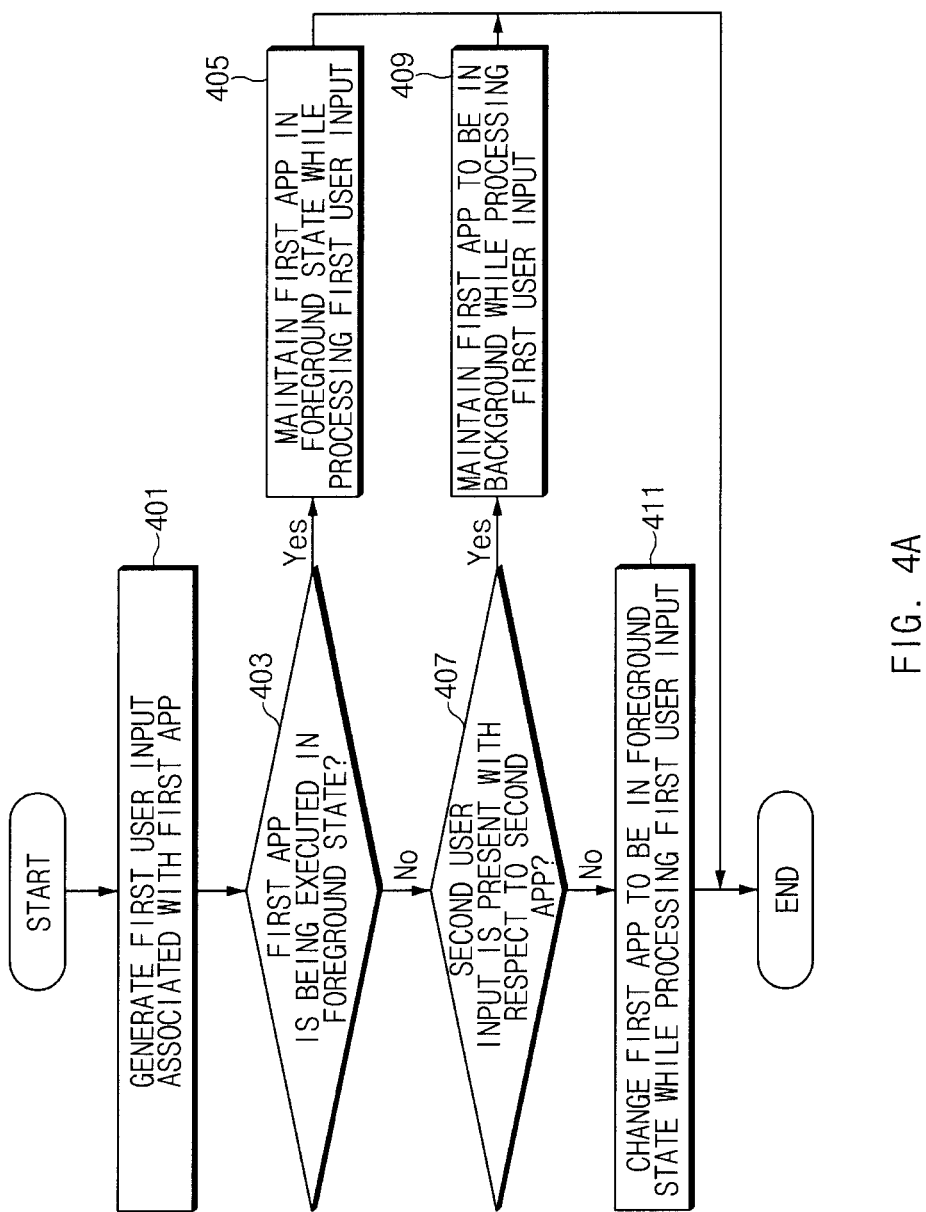
FIG. 4A is a view illustrating a first state controlling method for an app associated with a user input of a user terminal, according to an embodiment.
Figure 4B:
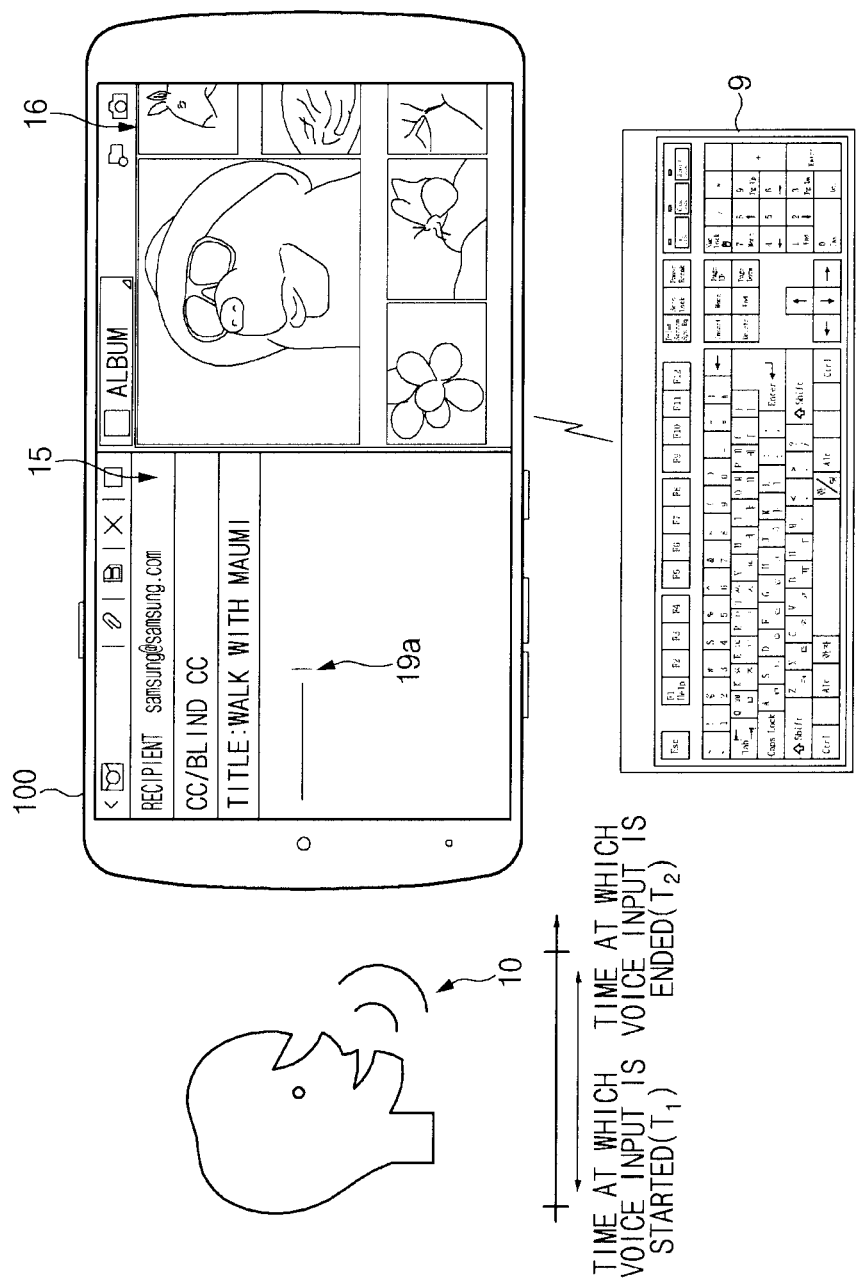
FIG. 4B is a view illustrating a first example of the first state controlling method for the app associated with the user input of the user terminal, according to an embodiment.
Figure 4C:
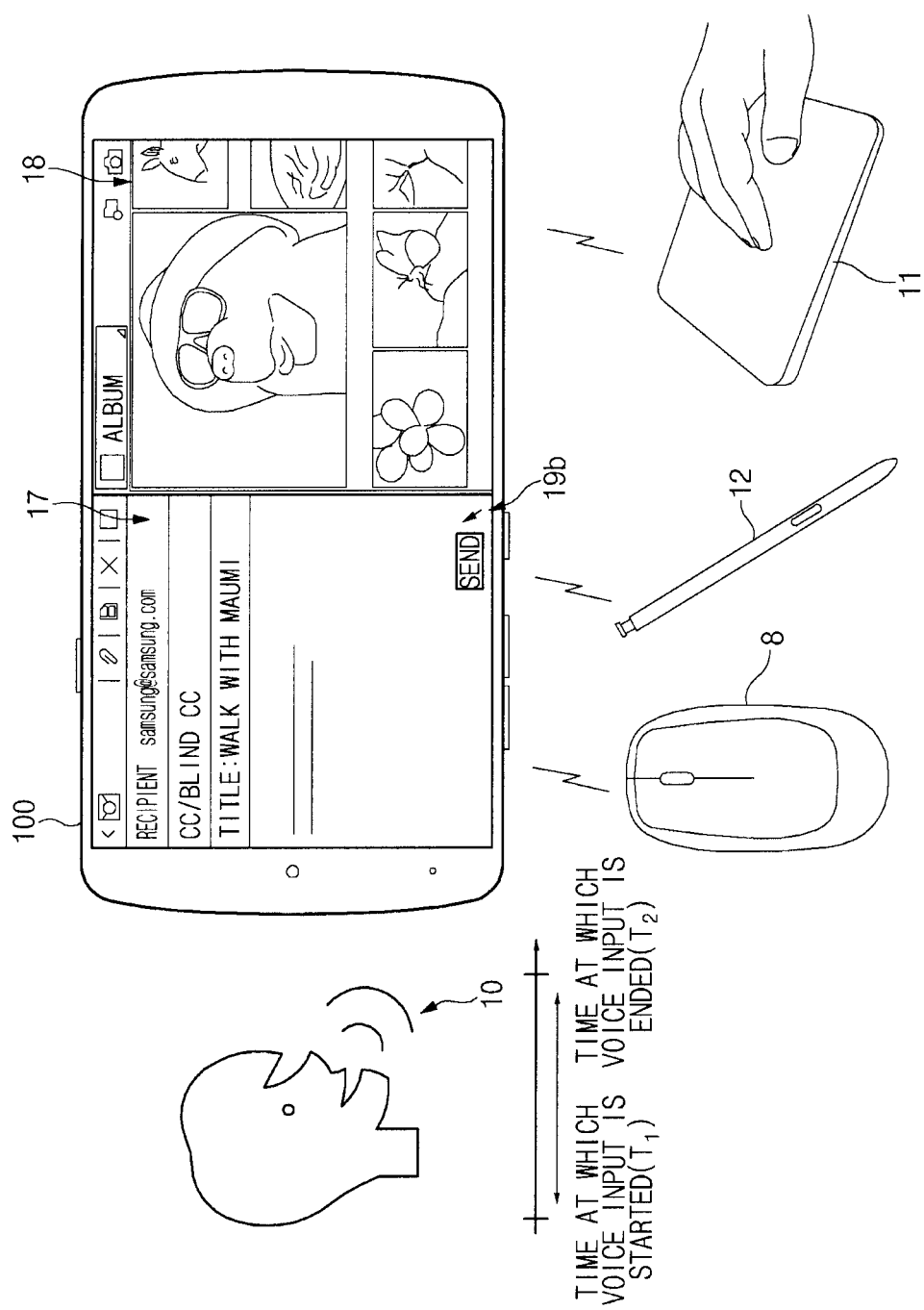
FIG. 4C is a view illustrating a second example of the first state controlling method for the app associated with the user input of the user terminal, according to an embodiment.

FIG. 4A is a view illustrating a method of controlling the first state with respect to the app associated with the user input in the user terminal, according to an embodiment. FIGS. 4B and 4C are views illustrating various examples of the first state controlling method, according to an embodiment. It may be understood from FIGS. 4A to 4C that the user terminal may be executing a plurality of apps and outputting windows corresponding to the apps.

Referring to FIG. 4A, in operation 401, an intelligent agent (see reference numeral 151 of FIG. 1B) of a user terminal (see, reference numeral 100 of FIG. 1B) may receive a first user input for a first app of apps which are executing. The first user input may be understood as, for example, a voice input received through a microphone (see, reference numeral 111 of FIG. 1C) mounted in the user terminal. According to an embodiment, the intelligent agent 151 may transmit data, which is associated with the first user input, to an intelligent server (see, reference numeral 200 of FIG. 1D) through a communication circuit (see, reference numeral 160 of FIG. 1B). In addition, the intelligent agent 151 may receive a path rule, which corresponds to the voice input (or the first user input), from the intelligent server and transmit the path rule to an execution manager module (see, reference numeral 153 of FIG. 1B), through the communication circuit (see, reference numeral 160 of FIG. 1B).

In operation 403, a processor (see, reference numeral 150 of FIG. 1B) of the user terminal may determine the state for the first app which is executing. In this regard, the processor may identify the first app corresponding to the first user input, based on performing a function of the execution manager module (e.g., based on determining an app associated with the path rule). The processor may determine whether the first app is in the foreground state or background state by obtaining at least one piece of information on the identified first app from an app managing module (see, reference numeral 170 of FIG. 1B).

According to an embodiment, when the first app is executing in the foreground state, the processor might not additionally control the state of the first app in association with processing the first user input in operation 405. For example, the processor may control the functional action of the first app to meet the voice input intent of the user, by maintaining the first app to be in the foreground state while processing the first user input (e.g., executing the path rule for the first app).

When the first app is executing in the background state, in operation 407, the processor may determine whether a second user input is generated with respect to at least one second app of the apps, which are executing, except for the first app during the time that the voice input is generated. For example, the processor may determine whether the second user input is generated during a time period starting when the voice input is generated and ending when the voice input is ended (or from a time at which the receiving of the first user input is started to a time at which the receiving of the first user input is ended). The second user input may be an input generated through an input manner different from that of the first user input or may be understood as an input generated through an input device, such as a mouse, a keyboard, a touch pad, or a touch pen, or a user body (e.g., a finger).

According to an embodiment, when the second user input is generated during the time period, the processor might not additionally control the state of the first app, which is executing in the background state, to be in operation 409. The processor may maintain the first app to be in the background state while processing the first user input (e.g., execute the path rule) associated with the first app. As described above, when the second user input (e.g., a typing input, a click input, a touch input, or a drag input) is generated with respect to the second app while the user utterance is generated, the processor may process the second user input with respect to the second app to be in the foreground state by controlling the first app, which corresponds to the user utterance, to be in the background state. According to an embodiment, when the second user input is not generated in the time range that the user utterance is generated, in operation 411, the processor may process the first user input with respect to the first app by changing the first app, which is executing in the background state, to be in the foreground state.

Referring to FIGS. 4B and 4C for various examples of operations 401 to 411 described above, the intelligent agent 151 of the user terminal 100 may receive the voice input 10 associated with the control of the functional action of the first app of the apps which are executing. The intelligent agent 151 may transmit data, which is associated with the first user input, to the intelligent server 200 and may receive a path rule, which corresponds to the voice input 10 (or the first user input), from the intelligent server 200. According to an embodiment, the processor 150 of the user terminal 100 may identify the first app corresponding to the voice input 10, based on the function (e.g., an operation of determining an app associated with the path rule) of the execution manager module 153 which transmits the path rule (e.g., operations included in the path rule) to the associated app.

According to an embodiment, the processor 150 may determine whether the state of a first window (e.g., reference numeral 16 of FIG. 4B or reference numeral 18 of FIG. 4C) is changed as the first app is executed as a result of processing (e.g., performing a path rule) the first user input. In this regard, the processor 150 may determine the output state (e.g., a foreground state or a background state) of the first window (see reference numeral 16 or 18), based on the information on the state of the first app, which is acquired from the app managing module 170. When the first window (see, reference numeral 16 or 18) is being output in the foreground state, the processor 150 may maintain the first window to be in the foreground state while processing the first user input (e.g., perform the path rule), without changing the state of the first window (see reference numeral 16 or 18).

When the first window (see, reference numeral 16 or 18) is in the background state, the processor 150 may change the state of the first window (see, reference numeral 16 or 18) depending on whether the second user input is generated for at least one second window (e.g., reference numeral 15 of FIG. 4B or reference numeral 17 of FIG. 4C). For example, when the second user input is generated for the second window (see, reference numeral 15 or 17) between a time ($T_1$) the voice input 10 is started and a time ($T_2$) the voice input 10 is ended, the processor 150 may determine that (1) the user intends to control or operate the second window (see, reference numeral 15 or 17, or the second app corresponding to the second window) and (2) maintain the first window (see, reference numeral 16 or 18) and the second window (see, reference numeral 15 or 17) in the background state and the foreground state, respectively, while processing the first user input. Alternatively, when the second input is not generated for the second window (see, reference numeral 15 or 17) between the time ($T_1$) and time ($T_2$), the processor 150 may change the first window (see, reference numeral 16 or 18) from the background state to the foreground state and may process the first user input.

According to an embodiment, the second user input may be a typing input, a click input, a touch input, or a drag input generating based on an input device (e.g., the mouse 8, the keyboard 9, the touch pad 11, or the touch pen 12) or a. According to various embodiments, the user terminal 100 may display at least one object for supporting the second user input. For example, the user terminal 100 may display at least one of a cursor object 19a for supporting the typing input or a pointing object 19b for supporting the click input, depending on the external input device (e.g., the mouse 8, the keyboard 9, or the touch pad 11) connected with the user terminal 100.

Figure 5A:
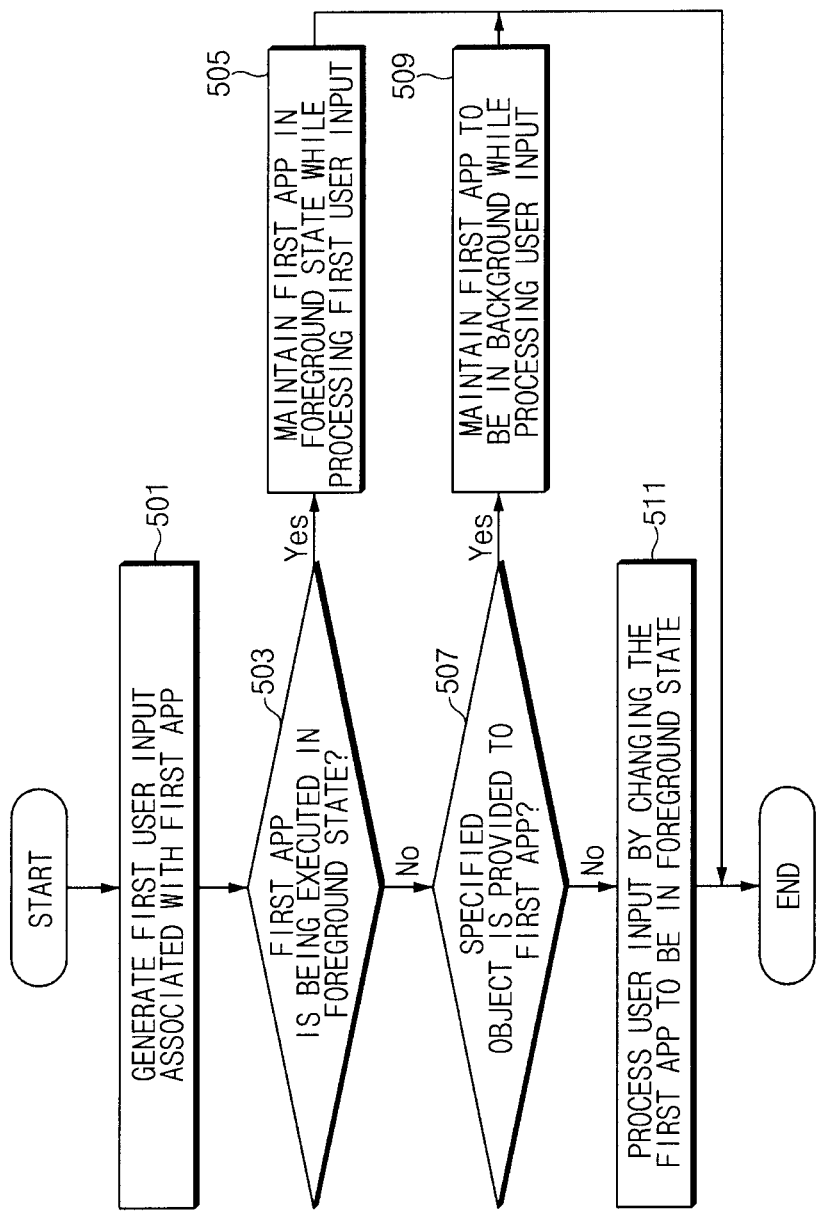
FIG. 5A is a view illustrating a second state controlling method for the app associated with the user input of the user terminal, according to an embodiment.
Figure 5B:
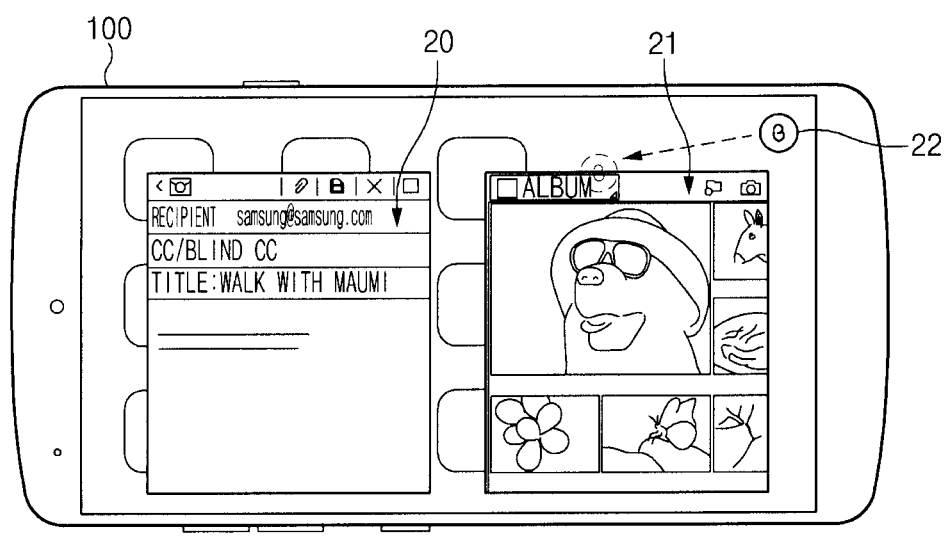
FIG. 5B is a view illustrating an example of the second state controlling method for the app associated with the user input of the user terminal, according to an embodiment.

FIG. 5A is a view illustrating a second state controlling method for the app associated with the user input of the user terminal, according to an embodiment. FIG. 5B is a view illustrating one example of the second state controlling method, according to an embodiment. It may be understood from FIGS. 5A and 5B that the user terminal may be executing a plurality of apps and outputting windows corresponding to the apps.

According to an embodiment, a specific display object (e.g., an icon or a badge) may be provided on one of screen regions of a display (see, reference numeral 120 of FIG. 1B) of a user terminal (see, reference numeral 100 of FIG. 1B) except for regions in which the windows are being output. The position of the specific display object may be, for example, varied under user control (e.g., a drag) on the screen region of the display 120. According to an embodiment, a processor (see, reference numeral 150 of FIG. 1B) of the user terminal 100 may control the state of the window of a first app (e.g., the foreground state or the background state) for receiving a voice input, depending on the position of the specific display object, in association with processing (e.g., executing a path rule) the first user input (e.g., a voice input) based on the voice input.

In this regard, operation 501 to operation 505 illustrated in FIG. 5A may be performed identically or similarly to operation 401 to operation 405 described above with respect to FIG. 4A and the redundant details will be omitted in the following description.

In operation 507, the processor 150 may determine the position relationship between the window of the first app, which is being output in the background state, and the specific display object. For example, the processor 150 may determine whether the specific display object floats on the window of the first app.

According to an embodiment, when at least a portion of the specific display object floats on the window of the first window, the processor 150 may maintain the window of the first app to be in the background state in operation 509 while processing the first user input (e.g., perform the path rule).

Alternatively, when the position of the specific display object is not controlled (or, changed) by a user or at least a portion of the specific display object does not float on the window of the first app, the processor 150 may change the window of the first app, from the background state to the foreground state and may process the first user input in operation 511.

For another example, referring to FIG. 5B, the processor 150 may output a specific display object 22 on one screen region of the display 120 to correspond to specified schedule information, when a multitasking environment is created on the user terminal 100. Alternatively, the processor 150 may output the specific display object 22 to correspond to system settings of the user terminal 100 of the user. According to an embodiment, the specific display object 22 may be output to a region which is not overlapped with at least one window (see, reference numeral 20 or 21) which is being output to the display 120.

According to an embodiment, the processor 150 may take into consideration the position of the specific display object 22, while processing (e.g., executing a path rule) the first user input (e.g., a voice input). However, when a window (e.g., reference numeral 21) of the first app corresponding to the voice input is in the foreground state, the processor 150 may maintain the window of the first app in the foreground state while processing the first user input, without taking into consideration the specific display object 22. When the window 21 of the first app is in the background state, the processor 150 may determine whether the specific display object 22 floats on the window 21 of the first app. When at least a portion of the specific display object 22 is in the floating state on the window 21 of the first app under user control, the processor 150 may maintain the window 21 of the first app to be in the background state. Accordingly, the processor 150 may maintain a window (e.g., reference numeral 20) of any one of at least one second app, which is executing, to be in the foreground state while processing the first user input.

Figure 6:
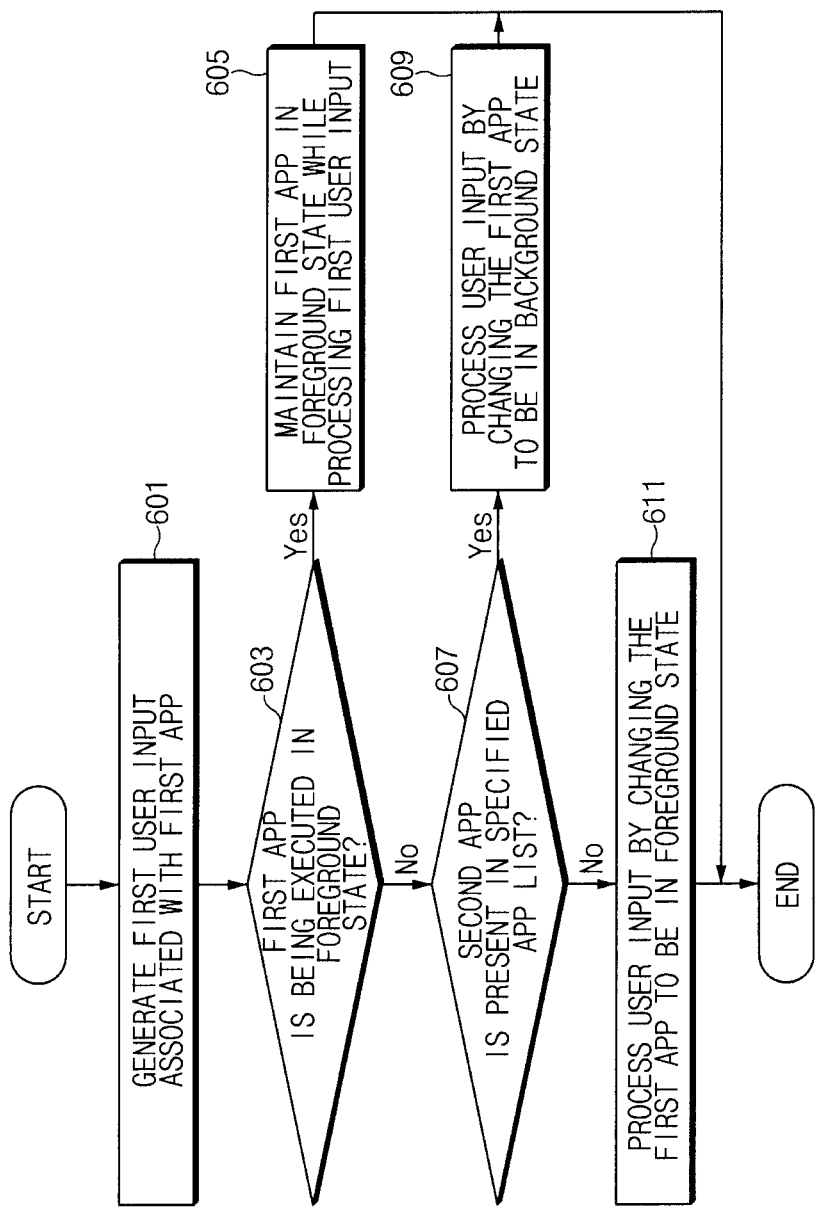
FIG. 6 is a view illustrating a third state controlling method for the app associated with the user input of the user terminal, according to an embodiment.

FIG. 6 is a view illustrating a third state controlling method for the app associated with the user input of the user terminal, according to an embodiment.

According to an embodiment, at least some of one or more apps mounted or installed in a user terminal (see, reference numeral 100 of FIG. 1B) may be specified in the state (e.g., a foreground state or a background state) thereof under a multitasking environment by a user or an app developer. For example, the user or the app developer may specify that an app having a higher level in security, an app employing a time limit to a user input, or an app supporting the viewing of content is always executed in the foreground state under an environment (e.g., a multitasking environment) of executing a plurality of apps. The processor (150 of FIG. 1B) of the user terminal 100 may manage at least one app, which is specified to be in the foreground state, in the form of a list.

In this regard, operation 601 to operation 605 illustrated in FIG. 6 may be performed identically or similarly to operation 401 to operation 405 described above with respect to FIG. 4A and the redundant details will be omitted in the following description.

In operation 607, in association with processing (e.g., executing a path rule) a first user input (e.g., a voice input), it is determined whether at least one second app of a plurality of apps, which are executing, except for the first app is included in the list, when the first app corresponding to the first user input is executing in the background state.

When the at least one second app is included in the list, in operation 609, the processor 150 may not separately control the state of the first app or the second app and may maintain the second app included in the list and the first app to be in the foreground state and the background state, respectively, while processing the first user input.

Alternatively, when any one second app is not included in the list, in operation 611, the processor 150 may change the state of the first app from the background state to the foreground state and process the first user input.

Figure 7A:
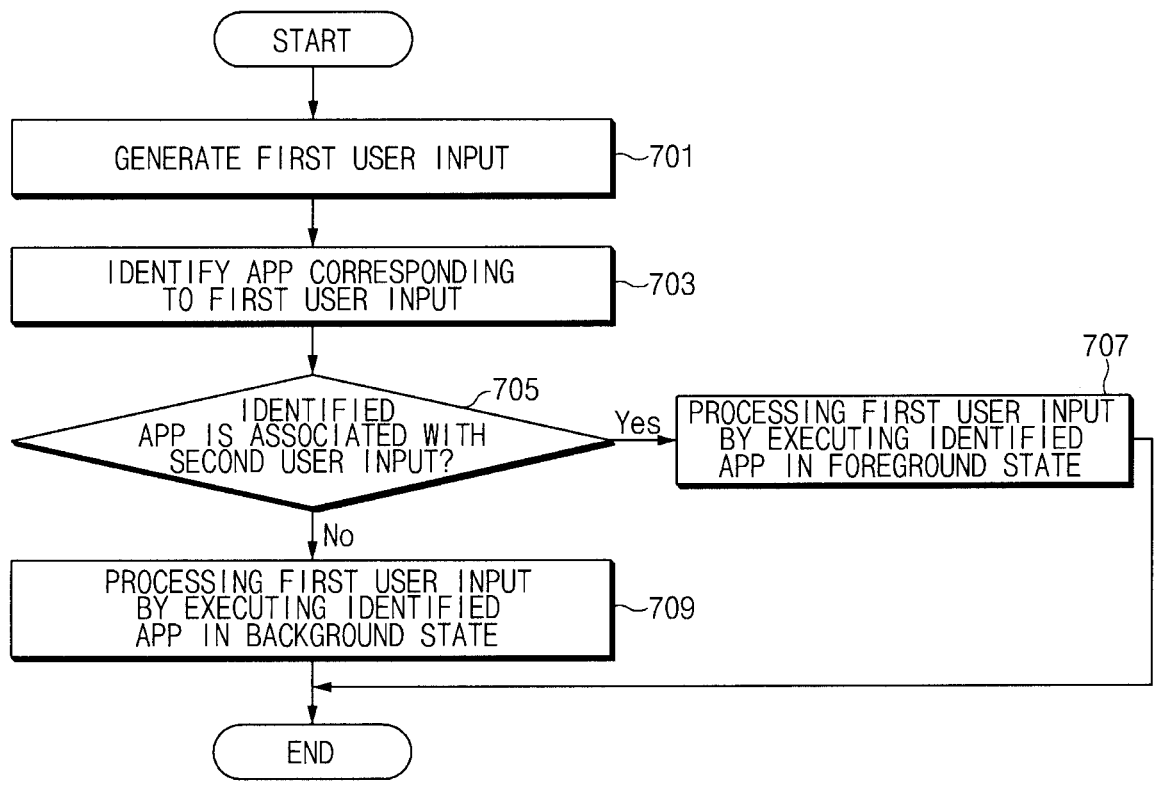
FIG. 7A is a view illustrating a fourth state controlling method for the app associated with the user input of the user terminal, according to an embodiment.
Figure 7B:
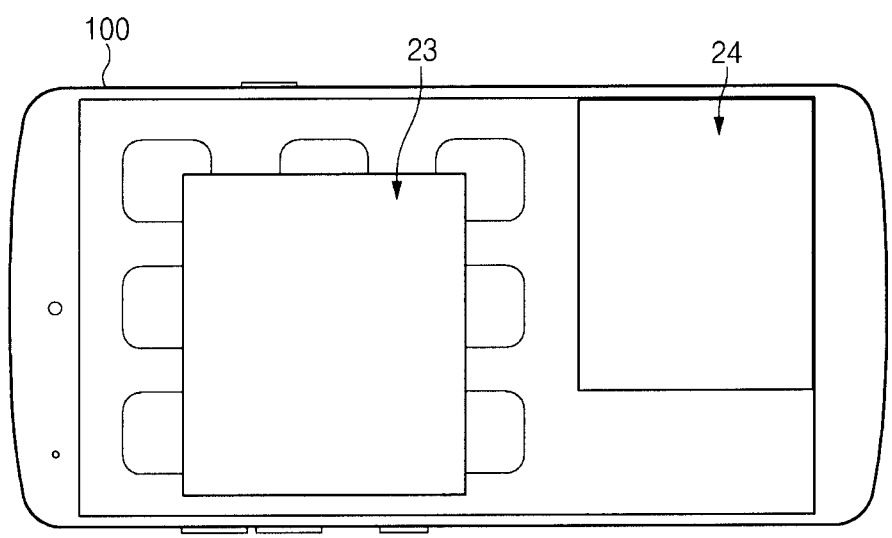
FIG. 7B is a view illustrating a first example for processing a user input of a user terminal, according to an embodiment.

FIG. 7A is a view illustrating a fourth state controlling method for an app associated with a user input of a user terminal, according to an embodiment, and FIG. 7B is a view illustrating a first example for processing the user input of the user terminal, according to an embodiment. It may be understood from FIGS. 7A and 7B that the user terminal is executing only at least one first app or executing a second app together with the at least one first app at the same time.

Referring to FIG. 7A, in operation 701, an intelligent agent (see, reference numeral 151 of FIG. 1B) of a user terminal (see, reference numeral 100 of FIG. 1B) may receive a first user input (e.g., a voice input) for a function of the second app which is executing or has not executed yet. The intelligent agent 151 may transmit data, which is associated with the first user input, to the intelligent server 200 and may receive a path rule, which corresponds to the voice input, from the intelligent server 200.

In operation 703, a processor (see reference numeral 150 of FIG. 1B) of the user terminal 100 may identify the second app corresponding to the voice input (or the first user input). For example, the processor 150 may identify the second app based on performing the function of an execution manager module (see, reference numeral 153 of FIG. 1B) determining an app associated with the path rule.

In operation 705, the processor 150 may determine whether a second user input (e.g., a typing input based on a keyboard or a touch screen) is applicable to the identified second app. For example, the processor 150 may determine whether the second user input is applicable to the second app, by taking into consideration information on at least one operation included in the path rule and information of attributes (e.g., the type, the version, or the installation information of the app) of the second app obtained from an app managing module (see, reference numeral 170 of FIG. 1B).

According to an embodiment, the processor 150 may determine the second app as an app to which the second user input is applicable, when the second app is an app, such as a message app, an e-mail app, a memo-app, or a calculator app, allowing a typing input of a character, a number, or a symbol, or an app (e.g., the input of an identifier or a password) requiring a typing input when the app is managed. In this case, in operation 707, the processor 150 may execute the second app, which corresponds to the user utterance, in the foreground state or control the second app to be in the foreground state (or may output or control the window of the second app to be in the foreground state) and may process the first user input (e.g., may perform a path rule).

If it is determined that the second user input is not applicable to the second app or the applying of the second user input to the second app is unnecessary, the processor 150 may execute or control the second app (or the window of the second app), which corresponds to the user utterance, in the background state and may process the first user input in operation 709.

According to an embodiment, when the second app corresponding to the user utterance is executed while at least one first app is executing, the window of the second app, which is newly output, may be at least partially overlapped with the window of the first app which has been output. In this case, at least a portion of content included in any one of the windows may be hidden by the remaining window and thus may not be clearly viewed. In this regard, referring to FIG. 7B, the processor 150 may control an output position of the window of the second app. The processor 150 may identify the output position of a window 23 of the first app, which has been output, by obtaining window information (e.g., the output size or the output coordinates of the window) from a window managing module (see, reference numeral 190 of FIG. 1B).

According to an embodiment, the processor 150 may obtain information on a region having no window 23 of the first app in a screen region of a display (see, reference numeral 120 of FIG. 1B) and may output a window (e.g., reference numeral 24) of the second app to at least a portion of the region. In this case, the processor 150 may move the window 23 of the first app, which has been output, to a specific position by taking into consideration the output size of the window 24 of the second app. Alternatively, according to various embodiments, the processor 150 may designate at least a portion of the screen region of the display 120 as a region for the window to be newly output. In this case, the processor 150 may output the window 23 of the first app to a region other than the designated region in the operation of outputting the window 23 of the first app and then may output the window 24 of the second app to the designated region.

Figure 8A:
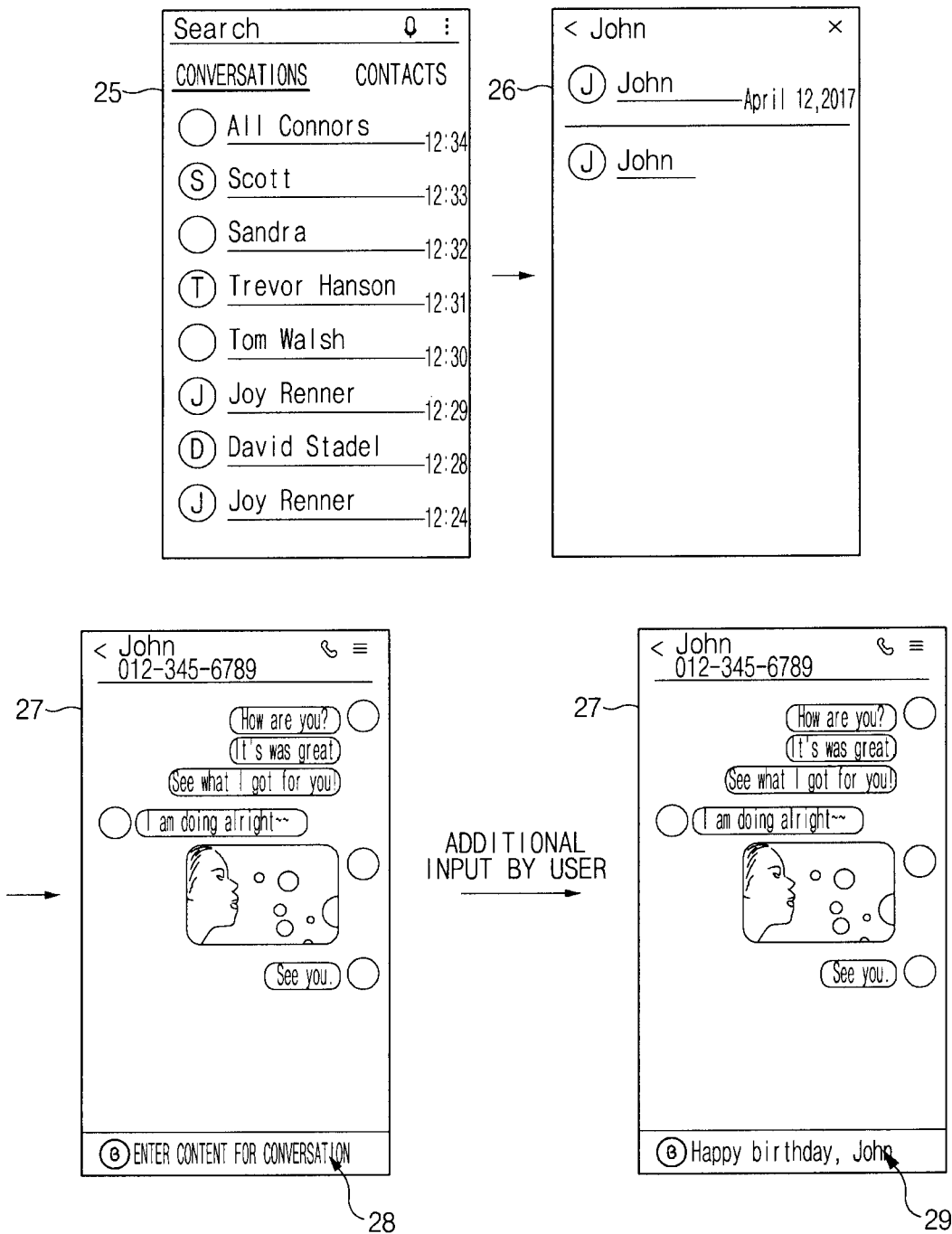
FIG. 8A is a view illustrating a second example for processing a user input of a user terminal, according to an embodiment.
Figure 8B:
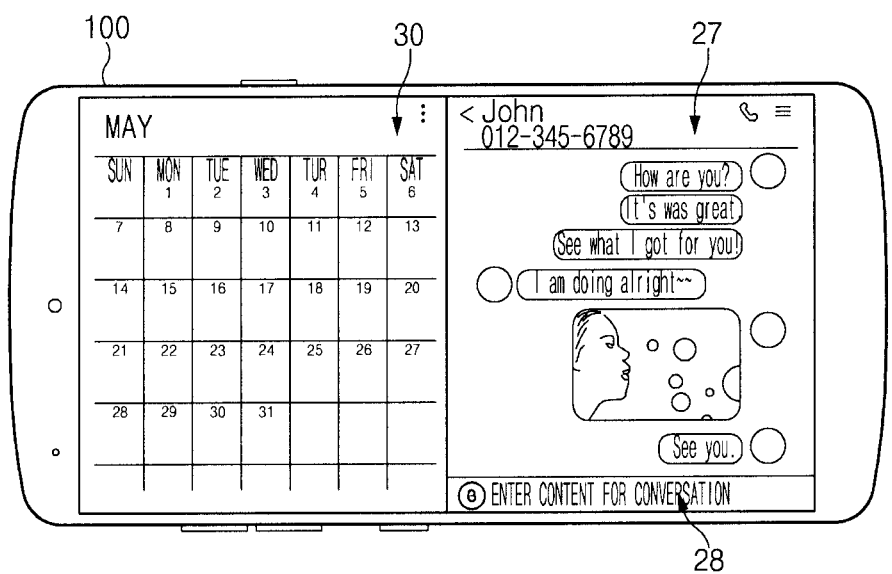
FIG. 8B is a view illustrating a fifth state controlling method for the app associated with the user input of the user terminal, according to an embodiment.

FIG. 8A is a view illustrating a second example for processing a user input of a user terminal, according to an embodiment, and FIG. 8B is a view illustrating another state controlling method for the app associated with the user input of the user terminal, according to an embodiment.

According to an embodiment, an intelligent agent (see, reference numeral 151 of FIG. 1B) of a user terminal (see, reference numeral 100 of FIG. 1B) may receive a user input (e.g., a voice input) including a specific intent or command to transmit data, which is associated with the user input, to an intelligent server (see, reference numeral 200 of FIG. 1D) and to receive a path rule, which corresponds to user utterance, from the intelligent server 200. In this operation, when the voice input is simplified or unclear, the intelligent agent 151 may receive an incomplete pass rule from the intelligent server 200. For example, when a user makes utterance such as "send a message to John", information, such as the content of the message, is omitted from the voice input, and thus there may be an absent parameter (e.g., the content of the message) required to perform some (e.g., an operation of inputting the content of the message) of one or more operations included in a path rule. In this regard, when receiving the incomplete path rule from the intelligent server 200, the intelligent agent 151 may output a feedback (e.g., a message) to request for the input of additional information by the user at a specific time (e.g., a time at which an action, which is an available one (including the parameter information) of at least one action included in the path rule, is finished). The intelligent agent 151 may transmit data on the additional information, which is input from the user, to the intelligent server 200 to support (e.g., reflect parameter information, which is obtained from the additional information of the user, in the path rule previously created) the update of the path rule of the intelligent server 200 or to receive an updated path rule from the intelligent server 200 and to process the updated path rule.

In this regard, referring to FIG. 8A, the intelligent agent 151 may receive a user input (e.g., a voice input) (e.g., "Send a message to John"), may transmit data associated with the user input to the intelligent server 200, and may receive a path rule corresponding to the voice input from the intelligent server 200. The intelligent agent 151 may transmit the path rule to an execution manager module (see, reference numeral 153 of FIG. 1B) and the execution manager module may transmit the information on a first action (e.g., an action of executing a message app) included in the path rule to an execution service module which is included in an app (e.g., a message app) corresponding to the intent of the voice input. The execution service module may perform the first action, based on parameter information corresponding to the first action and thus a processor (see, reference numeral 150 of FIG. 1B) of the user terminal 100 may output a result screen 25 (e.g., a screen for entering a message app) obtained by executing the first action.

According to an embodiment, the execution service module may transmit information representing the completion of the first action to the execution manager module 153 and may receive the information on a second action (e.g., an action of searching for a message recipient), which is arranged next to the first action on the path rule, from the execution manager module 153. When the second action is performed by the execution service module, the processor 150 may output a result screen 26 (e.g., a screen for searching for John) obtained by executing the second action. Thereafter, the execution manager module 153 may transmit information on a third action (e.g., an action for entering a message interface) to the execution service module, based on information on the completion of the second action, which is received from the execution service module. As the execution service module executes the third action, the processor 150 may output a screen 27 (e.g., a screen for a message interface with John) obtained by executing the third action.

According to an embodiment, the execution service module may determine the absence of parameter information (e.g., message content) necessary to execute a fourth action, at a time at which the fourth action (e.g., an action of inputting the content of a message) on the path rule, which is received from the execution manager module 153, is changed to be in an executable state. The intelligent agent 151 may transmit the information (e.g., the absence of the parameter information) determined by the execution service module to the intelligent server 200. Accordingly, an NLG (see, reference numeral 250 of FIG. 1D) of the intelligent server 200 may create a feedback to request for the input of the additional information by the user. The intelligent agent 151 may receive the feedback from the intelligent server 200 and may display (e.g., may display "Enter the content of the message"; see reference numeral 28) on one region of a result screen 27 obtained by executing the third action.

According to an embodiment, a user may recognize that the initial user utterance (e.g., "Send a message to John") is insufficient as the feedback is displayed (see, reference numeral 28) and may make additional voice input (e.g., "Happy Birthday John") to input additional information (e.g., parameter information) required to perform the fourth action. For example, the user may activate a microphone (see, reference numeral 111 of FIG. 1C) of the user terminal 100 by continuously pressing a hardware key (see, reference numeral 112 of FIG. 1C) of the user terminal or an object, which is included in the result screen 27 obtained by performing the third action, and may input the additional information based on the additional voice input.

According to an embodiment, an NLU 220 of the intelligent server 200 may update a path rule which is previously created. For example, the NLU 220 may create an updated path rule by applying the additional information (e.g., the additional information or additional parameter information based on the additional utterance), which is received from the intelligent agent 151, to the path rule, which is previously created. The updated path rule may be transmitted to the intelligent agent 151 and the execution manager module 153 may receive the updated path rule from the intelligent agent 151 to identify the fourth action (e.g., an action of inputting the content of the message) having no parameter information (e.g., the content of the message). The execution manager module 153 may transmit the information on the identified fourth action to the execution service module of the app (e.g., the message app). As the execution service module executes the fourth action, the content (e.g., "Happy Birthday John") of the message may be displayed (see, reference numeral 29) on one region of a result screen 27 obtained by executing the third action.

Referring to FIG. 8B, the intelligent agent 151 may receive a path rule from the intelligent server 200 as a user input (e.g., a voice input) (e.g., "Send a message to John") is generated in the state that windows 27 and 30 are output as a plurality of apps are executed. For example, the path rule may be understood as a path rule having no parameter information (e.g., the content of the message) required to perform some actions (e.g., an action of inputting the content of the message) as the information is omitted from the voice input.

According to an embodiment, in the operation of processing a user input (e.g., performing a path rule), the intelligent agent 151 may output a feedback (e.g., a message), which requests for the input of additional information by the user, to one region of the first window 27 associated with a first app (e.g., a message app) corresponding to the voice input, as specific parameter information (e.g., the content of the message) is absent from the path rule. In this case, the processor 150 may control the first window 27 to be in the foreground state such that a user recognizes the request for the input of the additional information (to standby the input of the additional information). According to various embodiments, when the input of the additional information by the user is performed through an input (e.g., a voice input), the processor 150 might not additionally control the state of the first window 27.

Figure 9:
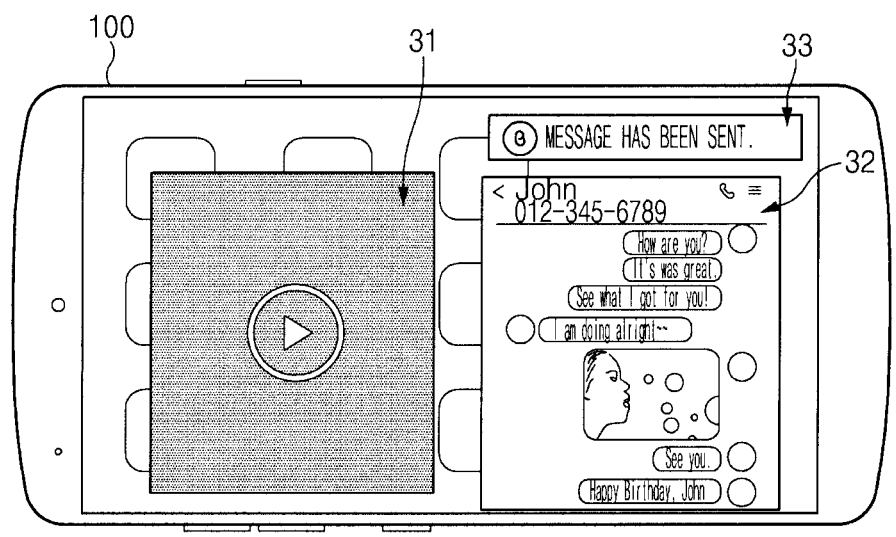
FIG. 9 is a view illustrating a third example for processing a user input of a user terminal, according to an embodiment.

FIG. 9 is a view illustrating another example for processing a user input of a user terminal, according to an embodiment.

Referring to the above description, the execution manager module (see, reference numeral 153 of FIG. 1B) of the user terminal (see, reference numeral 100 of FIG. 1B) may transmit information on one or more actions included in the path rule to an execution service module, which is present in an app corresponding to the path rule, and may receive information on the completion of the at least one operation from the execution service module. As described above, when information on the completion of the final action of one or more actions included in the path rule is received from the execution service module, the execution manager module 153 may transmit information on the completion of the final action to the intelligent agent 151. The intelligent agent 151 may transmit the received information on the completion of the final action to an NLG (see, reference numeral 250 of FIG. 2D) of the intelligent server (see, reference numeral 200 of FIG. 1D).

According to an embodiment, the NLG 250 may create a relevant text feedback based on the information on the completion of the final action and may transmit the text feedback to the intelligent agent 151. In addition, the NLG 250 may transmit the created text feedback to a TTS module (see, reference numeral 260 of FIG. 1D). The TTS 260 may convert the text feedback, which is received from the NLG 250, to a voice feedback and may transmit the voice feedback to the intelligent agent 151.

In this regard, referring to FIG. 9, the intelligent agent 151 may receive user utterance (e.g., "send John a message of "Happy Birthday John") including a command or intent for controlling the functional action of a specific app (e.g., a message app) among a plurality of apps which are executing. Accordingly, the intelligent agent 151 may receive a path rule, which corresponds to the user utterance, from the intelligent server 200 and the execution service module in an app corresponding to the path rule may perform one or more actions included in the path rule. According to an embodiment, when the final action of the one or more operations included in the path rule is completed, the intelligent agent 151 may receive a text feedback and a voice feedback corresponding to the user utterance or the final action from the intelligent server 200.

According to an embodiment, when receiving the text feedback and the voice feedback, a processor (see, reference numeral 150 of FIG. 1B) of a user terminal 100 may acquire at least one piece of information (e.g., information on attributes of an app or the operation information of the app) of a plurality of apps, which are executing, from an app managing module (see, reference numeral 170 of FIG. 1B). The processor 150 may identify an app (e.g., a song player app or a video player app), which is outputting a sound, based on the at least one piece of information. The processor 150 may control the selective output of the text feedback and the voice feedback received from the intelligent server 200, when at least one of the apps, which are executing, is outputting the sound. For example, when there is present an app which is outputting the sound, the processor 150 may exclude the voice feedback and output only the text feedback 33, thereby preventing the sound of the app from being overlapped with the voice feedback. For example, as an additional interface is made, the text feedback 33 may be output to a region different from or at least partially overlapped with regions for windows 31 and 33 based on the apps which are executing. Alternatively, the text feedback 33 may be output to be included in a window 32 associated with an app (e.g., a message app) corresponding to the user utterance (e.g., "Send John a message of "Happy Birthday John").

As described above, according to various embodiments, an electronic device supporting a multitasking environment may include a communication circuit to communicate with at least one external device, a microphone to receive user utterance, a memory to store a plurality of application programs, a display to output a plurality of virtual windows as the plurality of application programs are executed, and a processor electrically connected with the communication circuit, the microphone, the memory, and the display.

According to various embodiments, an electronic device supporting a multitasking environment, the electronic device comprises a communication circuit configured to communicate with at least one external device; a microphone configured to receive voice input; a memory storing a plurality of application programs; a display configured to output a plurality of virtual windows as the plurality of application programs are executed and at least one processor electrically connected with the communication circuit, the microphone, the memory, and the display, wherein the processor is configured to execute the plurality of application programs, determine whether at least one condition is satisfied for controlling a background state of a first window, when a first voice input is generated for controlling a function of a first application program in the first window that is in the background state, and maintain the first window in the background state and a second window, which is associated with a second application program, to be in a foreground state, while processing the first user input, when the at least one condition is satisfied.

According to various embodiments, the at least one processor is configured to when any one of the at least one specified condition is not satisfied, control the first virtual window to be in the foreground state and control the second window to be in the background state while processing the first user input.

According to various embodiments, the at least one processor is configured to communicate with at least one input device, which includes at least one of a keyboard, a mouse, a touch pad, the microphone, or a touch pen, based on the communication circuit.

According to various embodiments, the at least one processor is configured to maintain the first window in the background state while processing the first user input, when a second user input from the input device is generated for controlling a function of the second application program, during a time period starting when the first user input is generated and ending when the first user input is ended.

According to various embodiments, the at least one processor is configured to maintain the first window to be in the background state while processing the first user input, when a cursor object or a pointing object when a second user input based on the input device is present on the second window, during a time period starting when the first user input is generated and ending when the first user input is ended.

According to various embodiments, the at least one processor is configured to output a specified display object to at least one region of the display; and maintain the first window to be in the background state while processing the first user input, when at least a portion of the specified display object is displayed in overlap with at least a portion of the first window in response to a user control, before the first user input is ended.

According to various embodiments, the at least one processor is configured to create a list containing at least some of the plurality of application programs stored in the memory and determine whether the list contains the second application program, when the first user input is generated.

According to various embodiments, the at least one processor is configured to maintain the first window to be in the background state while processing the first user input, when the list contains the second application program.

According to various embodiments, the at least one processor is configured to determine whether a second user input based on the input device is applicable to the first application program, when the first user input is generated; and maintain the first window to be in the background state while processing the first user input, when the second user input is not applicable to the first application program.

According to various embodiments, the at least one processor is configured to control the first window to be in the foreground state, when displaying a feedback on at least one region of the first window to request for a specified information input, in the processing of the first user input.

According to various embodiments, the at least one processor is configured to receive text data and voice data from the external device, in the processing of the first user input; and display the text data on one region of the display, when at least one of the plurality of application programs, which are executing, is associated with a voice output.

As described above, according to various embodiments, an electronic device may include a housing, a touch screen display disposed inside the housing and having at least a portion exposed through a first region of the housing, a microphone disposed inside the housing and having at least a portion exposed through a second region of the housing, at least one speaker disposed inside the housing and having at least a portion exposed through a third region of the housing, a wireless communication circuit disposed inside the housing, a processor disposed inside the housing and electrically connected with the touch screen display, the microphone, the speaker, and the wireless communication circuit, and a memory disposed inside the memory and electrically connected with the processor.

According to various embodiments, the memory may store a first application program including a first user interface and a second application program including a second user interface.

According to various embodiments, the memory may store at least one instruction that, when executed, causes the processor to set at least one of wired communication or wireless communication for an external display device and an external input device, to display the first user interface and the second user interface on the external display device based on at least one of the wired communication or the wireless communication, to control the first application program to be in a state of receiving a first user input through the external input device, to receive a second user input for employing the second application program through the microphone, and to employ the second user input for the second application program during the controlling of the first application program to be in the state of receiving the first user input.

According to various embodiments, the memory may further include at least one instruction that, when executed, causes the processor to transmit data associated with the second user input to an external server, based on the wireless communication circuit, to receive, from the external server, a response, which includes information on a sequence of states of the electronic device, which are used to perform a task associated with the second user input, based on the wireless communication circuit, and to allow the electronic device to perform the task in the sequence of the states while at least partially displaying the sequence of the states of the electronic device in the second user interface.

According to various embodiments, a method for controlling a display of an electronic device supporting a multitasking environment comprises executing a plurality of application programs; receiving a voice input for a function of a first application program in a first window in a background; determining whether at least one condition is satisfied in association with controlling the background state of the first virtual window; and maintaining the first virtual window to be in the background state and controlling a second window associated with a second application program to be in a foreground state while processing the first user input, when at least one of the at least one specified condition is satisfied.

According to various embodiments, the processing of the first user input includes maintaining the first window to be in the background state while processing the first user input, when a second user input based on the input device or a user body is generated for a function of the one second application program, during a time period starting when the first user input is generated and ending at a time at which the first user input is ended.

According to various embodiments, the processing of the first user input includes maintaining the first window in the background state while processing the first user input, when a cursor object or a pointing object supporting a second user input is present on a second window, during a time period starting when the first user input is generated and ending at a time at which the first user input is ended.

According to various embodiments, the method further comprises outputting a specified display object to at least one region of the display of the electronic device, wherein the processing of the first user input includes maintaining the first window to be in the background state while processing the first user input, when a at least a portion of the specified display object is displayed in overlap with at least a portion of the first window in response to a user control, before a time at which the first user input is ended.

According to various embodiments, the method includes creating a list containing at least some of the plurality of application programs stored in the memory of the electronic device; and determining whether the list contains the second application program, when the first user input is generated, wherein the processing of the first user input includes maintaining the first window to be in the background state while processing the first user input, when a the list contains the second application program.

According to various embodiments, the method includes determining whether a second user input based on the input device or a user body is applicable to the first application program corresponding to the first user input, when the first user input is generated, wherein the processing of the first user input includes maintaining the first virtual window to be in the background state while processing the first user input, when the second user input is determined not to be applicable to the first application program.

According to various embodiments, the method includes displaying a feedback on at least one region of the first virtual window to request for a specified information input, in the processing of the first user input; and controlling the first virtual window to be in the foreground state, when the feedback is displayed.

According to various embodiments, the method may further include creating a list containing at least some of the plurality of application programs stored in the memory.

According to various embodiments, the method may further include determining whether the list contains at least one of the at least one second application program, when the first user input is generated.

According to various embodiments, the processing of the first user input may include maintaining the first virtual window to be in the background state while processing the first user input, when a fourth condition that the list contains at least one of the at least one second application program is satisfied.

According to various embodiments, the method may further include determining whether a second user input based on the input device or a user body is applicable to the first application program corresponding to the first user input, when the first user input is generated.

According to various embodiments, the processing of the first user input may include maintaining the first virtual window to be in the background state while processing the first user input, when a fifth condition that the second user input is determined not to be applicable to the first application program is satisfied.

According to various embodiments, the method may further include displaying a feedback on at least one region of the first virtual window to request for a specified information input, in the processing of the first user input.

According to various embodiments, the method may further include controlling the first virtual window to be in the foreground state, regardless of whether the at least one of the at least one specified condition is satisfied, when the feedback is displayed.

According to various embodiments, the method may further include receiving text data and voice data from the external device, in the processing of the first user input.

According to various embodiments, the method may further include displaying the text data on one region of the display, when at least one of the plurality of application programs, which are executing, is associated with a voice output.

Figure 10:
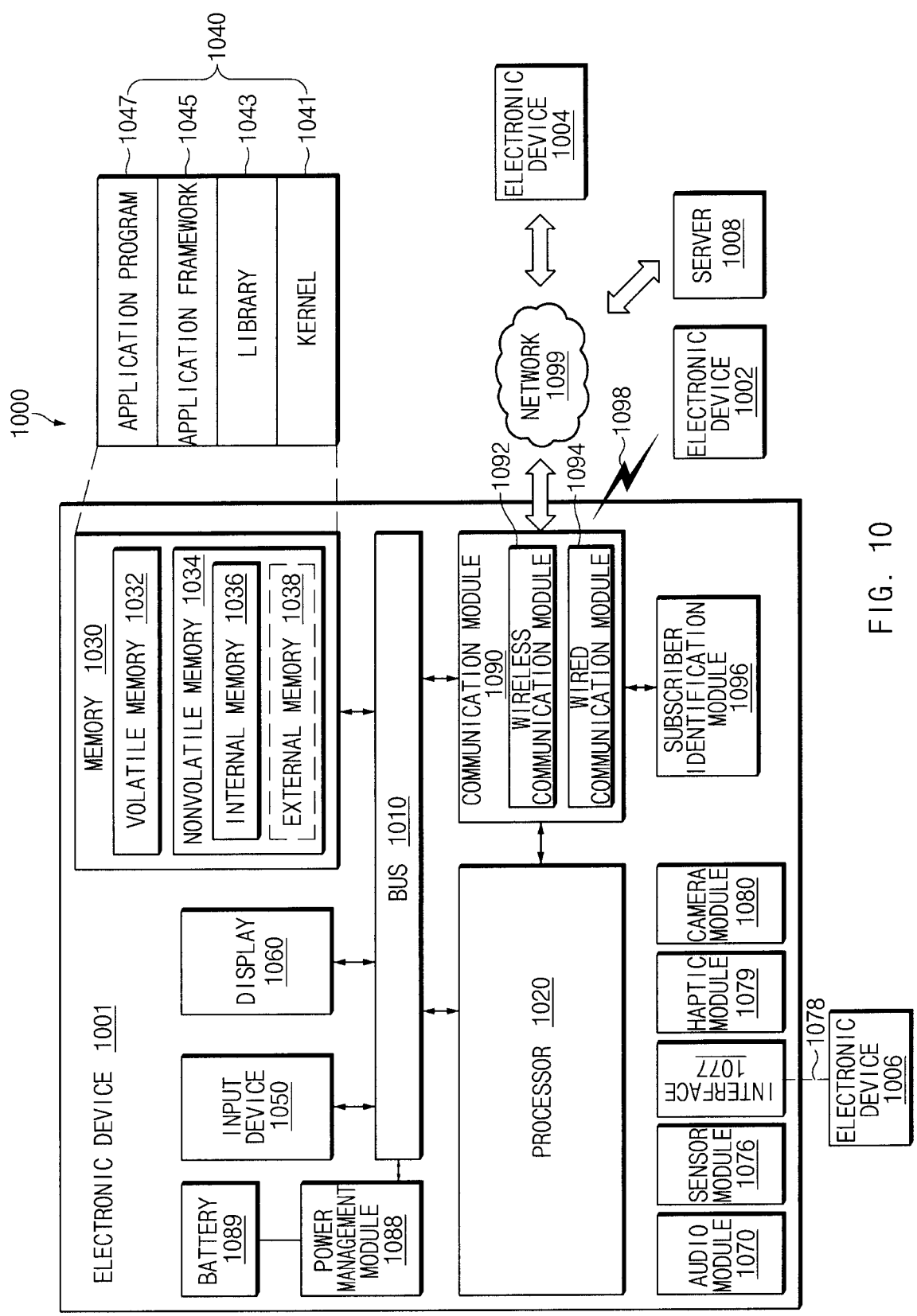
FIG. 10 illustrates a view illustrating an electronic device (or a user terminal) in a network environment, according to an embodiment.

FIG. 10 illustrates a block diagram of an electronic device (or a user terminal) in a network environment, according to an embodiment.

Referring to FIG. 10, under a network environment 2000, the electronic device 1001 (e.g., the electronic device 100 of FIG. 1B) may communicate with an electronic device 1002 through local wireless communication 1098 or may communication with an electronic device 1004 or a server 1008 through a network 1099. According to an embodiment, the electronic device 1001 may communicate with the electronic device 1004 through the server 1008.

According to an embodiment, the electronic device 1001 may include a bus 1010, a processor 1020 (e.g., the processor 150 of FIG. 1B), a memory 1030, an input device 1050 (e.g., a micro-phone or a mouse), a display device 1060, an audio module 1070, a sensor module 1076, an interface 1077, a haptic module 1079, a camera module 1080, a power management module 1088, a battery 1089, a communication module 1090, and a subscriber identification module 1096. According to an embodiment, the electronic device 1001 may not include at least one (e.g., the display device 1060 or the camera module 1080) of the above-described components or may further include other component(s).

The bus 1010 may interconnect the above-described components 1020 to 1090 and may include a circuit for conveying signals (e.g., a control message or data) between the above-described components. The processor 1020 may include one or more of a central processing unit (CPU), an application processor (AP), a graphic processing unit (GPU), an image signal processor (ISP) of a camera or a communication processor (CP). According to an embodiment, the processor 1020 may be implemented with a system on chip (SoC) or a system in package (SiP). For example, the processor 1020 may drive an operating system (OS) or an application to control at least one of another component (e.g., hardware or software component) connected to the processor 1020 and may process and compute various data. The processor 1020 may load a command or data, which is received from at least one of other components (e.g., the communication module 1090), into a volatile memory 1032 to process the command or data and may store the result data into a nonvolatile memory 1034.

The memory 1030 may include, for example, the volatile memory 1032 or the nonvolatile memory 1034. The volatile memory 1032 may include, for example, a random access memory (RAM) (e.g., a dynamic RAM (DRAM), a static RAM (SRAM), or a synchronous DRAM (SDRAM)). The nonvolatile memory 1034 may include, for example, an one time PROM (OTPROM), a programmable read-only memory (PROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1034 may be configured in the form of an internal memory 1036 or the form of an external memory 1038 which is available through connection only if necessary, according to the connection with the electronic device 1001. The external memory 1038 may further include a flash drive such as compact flash (CF), secure digital (SD), micro secure digital (Micro-SD), mini secure digital (Mini-SD), extreme digital (xD), a multimedia card (MMC), or a memory stick. The external memory 1038 may be operatively or physically connected with the electronic device 1001 in a wired manner (e.g., a cable or a universal serial bus (USB)) or a wireless (e.g., Bluetooth) manner.

For example, the memory 1030 may store, for example, at least one different software component, such as a command or data associated with the program 1040, of the electronic device 1001. The program 1040 may include, for example, a kernel 1041, a library 1043, an application framework 1045 or an application program (interchangeably, "application") 1047.

The input device 1050 may include a microphone, a mouse, or a keyboard. According to an embodiment, the keyboard may include a keyboard physically connected or a virtual keyboard displayed through the display 1060.

The display 1060 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1001.

The audio module 1070 may convert, for example, from a sound into an electrical signal or from an electrical signal into the sound. According to an embodiment, the audio module 1070 may acquire sound through the input device 1050 (e.g., a microphone) or may output sound through an output device (not illustrated) (e.g., a speaker or a receiver) included in the electronic device 1001, an external electronic device (e.g., the electronic device 1002 (e.g., a wireless speaker or a wireless headphone)) or an electronic device 1006 (e.g., a wired speaker or a wired headphone) connected with the electronic device 1001

The sensor module 1076 may measure or detect, for example, an internal operating state (e.g., power or temperature) of the electronic device 1001 or an external environment state (e.g., an altitude, a humidity, or brightness) to generate an electrical signal or a data value corresponding to the information of the measured state or the detected state. The sensor module 1076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1076 may further include a control circuit for controlling at least one or more sensors included therein. According to an embodiment, the sensor module 1076 may be controlled by using the processor 1020 or a processor (e.g., a sensor hub) separate from the processor 1020. In the case that the separate processor (e.g., a sensor hub) is used, while the processor 1020 is in a sleep state, the separate processor may operate without awakening the processor 1020 to control at least a portion of the operation or the state of the sensor module 1076.

According to an embodiment, the interface 1077 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 1078 may physically connect the electronic device 1001 and the electronic device 1006. According to an embodiment, the connector 1078 may include, for example, an USB connector, an SD card/MMC connector, or an audio connector (e.g., a headphone connector).

The haptic module 1079 may convert an electrical signal into mechanical stimulation (e.g., vibration or motion) or into electrical stimulation. For example, the haptic module 1079 may apply tactile or kinesthetic stimulation to a user. The haptic module 1079 may include, for example, a motor, a piezoelectric element, or an electric stimulator.

The camera module 1080 may capture, for example, a still image and a moving picture. According to an embodiment, the camera module 1080 may include at least one lens (e.g., a wide-angle lens and a telephoto lens, or a front lens and a rear lens), an image sensor, an image signal processor, or a flash (e.g., a light emitting diode or a xenon lamp).

The power management module 1088, which is to manage the power of the electronic device 1001, may constitute at least a portion of a power management integrated circuit (PMIC).

The battery 1089 may include a primary cell, a secondary cell, or a fuel cell and may be recharged by an external power source to supply power at least one component of the electronic device 1001.

The communication module 1090 may establish a communication channel between the electronic device 1001 and an external device (e.g., the first external electronic device 1002, the second external electronic device 1004, or the server 1008). The communication module 1090 may support wired communication or wireless communication through the established communication channel. According to an embodiment, the communication module 1090 may include a wireless communication module 1092 or a wired communication module 1094. The communication module 1090 may communicate with the external device (e.g., the first external electronic device 1002, the second external electronic device 1004, or the server 1008) through a first network 1098 (e.g. a wireless local area network such as Bluetooth or infrared data association (IrDA)) or a second network 1099 (e.g., a wireless wide area network such as a cellular network) through a relevant module among the wireless communication module 1092 or the wired communication module 1094.

The wireless communication module 1092 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (WiFi), WiFi Direct, light fidelity (LiFi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 1092 supports cellular communication, the wireless communication module 1092 may, for example, identify or authenticate the electronic device 1001 within a communication network using the subscriber identification module (e.g., a SIM card) 1096. According to an embodiment, the wireless communication module 1092 may include a communication processor (CP) separate from the processor 1020 (e.g., an application processor (AP)). In this case, the communication processor may perform at least a portion of functions associated with at least one of components 1010 to 1096 of the electronic device 1001 in substitute for the processor 1020 when the processor 1020 is in an inactive (sleep) state, and together with the processor 1020 when the processor 1020 is in an active state. According to an embodiment, the wireless communication module 1092 may include a plurality of communication modules, each supporting only a relevant communication scheme among cellular communication, local wireless communication, or a GNSS communication.

The wired communication module 1094 may include, for example, include a local area network (LAN) service, a power line communication, or a plain old telephone service (POTS).

For example, the first network 1098 may employ, for example, WiFi direct or Bluetooth for transmitting or receiving commands or data through wireless direct connection between the electronic device 1001 and the first external electronic device 1002. The second network 1099 may include a telecommunication network (e.g., a computer network (e.g., LAN or WAN), the Internet or a telephone network) for transmitting or receiving commands or data between the electronic device 1001 and the second electronic device 1004.

According to various embodiments, the commands or the data may be transmitted or received between the electronic device 1001 and the second external electronic device 1004 through the server 1008 connected with the second network 1099. Each of the first and second external electronic devices 1002 and 1004 may be a device of which the type is different from or the same as that of the electronic device 1001. According to various embodiments, all or some of operations that the electronic device 1001 will perform may be executed by another or a plurality of electronic devices (e.g., the electronic devices 1002 and 1004 or the server 1008). According to an embodiment, in the case that the electronic device 1001 executes any function or service automatically or in response to a request, the electronic device 1001 may not perform the function or the service internally, but may alternatively or additionally transmit requests for at least a portion of a function associated with the electronic device 1001 to any other device (e.g., the electronic device 1002 or 1004 or the server 1008). The other electronic device (e.g., the electronic device 1002 or 1004 or the server 1008) may execute the requested function or additional function and may transmit the execution result to the electronic device 1001. The electronic device 1001 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 1030).

The term "module" used herein may include a unit, which is implemented with hardware, software, or firmware, and may be interchangeably used with the terms "logic", "logical block", "part", "circuit", or the like. The "module" may be an integrated part or may be a minimum unit for performing one or more functions or a portion thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 1030) in the form of a program module. The instruction, when executed by a processor (e.g., a processor 1020), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, some of the above-described sub-components may be omitted or may further include other sub-components. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least some of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device supporting a multitasking environment, the electronic device comprising:
   a communication circuit configured to communicate with at least one external device;
   a microphone configured to receive voice inputs;

a memory storing a plurality of application programs and a path rule indicating a sequence of states of the electronic device executed to perform a requested task;

a display configured to output a plurality of screens corresponding to execution of the plurality of application programs; and at least one processor electrically connected with the communication circuit, the microphone, the memory, and the display, wherein the processor is configured to:

execute the plurality of application programs, including a first application executed in a background state, and a second application executed in a foreground state, wherein the first application is displayed in a first window, and the second application is displayed in a second window;

receive a first voice input through the microphone;

detect, based on the path rule, that the first voice input is to be applied to the first application from among the executed plurality of application programs;

determine whether at least one condition is satisfied for changing operation of the first window to the foreground state;

when the at least one condition is satisfied, process the first voice input by the first application while maintaining the first window in the background state and maintaining the second window in the foreground state; and when the at least one condition is not satisfied, change operation of the first window to the foreground state and change operation of the second window to the background state, while processing the first voice input.

2. The electronic device of claim 1, wherein the at least one processor is configured to:

communicate with at least one input device, which includes at least one of a keyboard, a mouse, a touch pad, the microphone, or a touch pen, based on the communication circuit.

3. The electronic device of claim 2, wherein the condition is receipt of a second user input from the input device for controlling a function of the second application during a time period when the first voice input is received, and wherein the at least one processor is configured to:

change operation of the first window to the foreground state while processing the first voice input, unless the second user input from the input device is generated for controlling the function of the second application, during the time period when the first voice input is received.

4. The electronic device of claim 2, wherein the condition is presence of a cursor object or a pointing object supporting a second user input based on the input device in the second window during a time period when the first voice input is received, and wherein the at least one processor is configured to:

change operation of the first window to be in the foreground state while processing the first user input, unless the cursor object or the pointing object supporting the second user input based on the input device is present in the second window, during the time period starting when the first voice input is received.

5. The electronic device of claim 1, wherein the condition is at least a portion of a specified display object overlapping with at least a portion of the first window in response to a user control before the first voice input is ended, and wherein the at least one processor is configured to:

change operation of the first window to be in the foreground state while processing a first user input, unless at least the portion of the specified display object is displayed in overlap with at least the portion of the first window in response to the user control, before the first voice input is ended.

6. The electronic device of claim 1, wherein the at least one processor is configured to:

create a list containing at least some of the plurality of application programs stored in the memory; and determine whether the list contains the second application, when the first voice input is generated.

7. The electronic device of claim 6, wherein the condition is whether the list includes the second application program, and wherein the at least one processor is configured to:

change operation of the first window to be in the foreground state while processing the first user input, when unless the list contains the second application.

8. The electronic device of claim 1, wherein the at least one processor is configured to:

control the first window to be in the foreground state, when displaying a feedback on at least one region of the first window to request for a specified information input, in the processing of a first user input.

9. The electronic device of claim 1, wherein the at least one processor is configured to:

receive text data and voice data from the external device, in the processing of a first user input; and display the text data on one region of the display, when at least one of the plurality of application programs, which are executing, is associated with a voice output.

10. An electronic device, comprising:

a housing;

a touch screen display disposed inside the housing and having at least a portion exposed through a first region of the housing;

a microphone disposed inside the housing and having at least a portion exposed through a second region of the housing;

at least one speaker disposed inside the housing and having at least a portion exposed through a third region of the housing;

a wireless communication circuit disposed inside the housing;

a processor disposed inside the housing and electrically connected with the touch screen display, the microphone, the speaker, and the wireless communication circuit; and a memory disposed inside the housing and electrically connected with the processor, wherein the memory stores a first application program including a first user interface, a second application program including a second user interface, and a path rule indicating a sequence of states of the electronic device executed to perform a requested task, and wherein the memory stores at least one instruction that, when executed, causes the processor to:

set at least one of wired communication or wireless communication for an external display device and an external input device;

display the first user interface and the second user interface on the external display device based on at least one of the wired communication or the wireless communication;

control the first application program to be in a foreground state of receiving a first user input through the external input device and the second application program to be in a background state nonresponsive to the first user input;

receive a second user input through the microphone and detect that the second user input is to be applied to the second application program from among the first and second application programs, based on the path rule; and process the second user input by the second application program while changing the first application program to the background state receiving the first user input, unless a specified condition is met.

11. The electronic device of claim 10, wherein the memory further stores at least one instruction that, when executed, causes the processor to:

transmit data associated with the second user input to an external server, based on the wireless communication circuit;

receive, from the external server, a response including information on a sequence of states of the electronic device, which are used to perform a task associated with the second user input, based on the wireless communication circuit; and allowing the electronic device to perform the task in the sequence of the states while at least partially displaying the sequence of the states of the electronic device on the second user interface.

12. The electronic device of claim 10, wherein the condition is inclusion of the first application in a predetermine list.

13. The electronic device of claim 10, wherein the condition is a cursor object or pointing object in the first user interface.

14. The electronic device of claim 10, wherein the condition is occurrence of the first user input and the second user input within a predetermined time threshold from each other.

15. A method for an electronic device, comprising:

storing a plurality of application programs and a path rule indicating a sequence of states of the electronic device executed to perform a requested task;

executing the plurality of application programs, including a first application executed in a background state, and a second application executed in a foreground state, wherein the first application is displayed in a first window, and the second application is displayed in a second window;

receiving a voice input through a microphone;

detecting, based on the path rule, that the voice input is to be applied to a function of the first application; determining whether at least one condition is satisfied for changing operation of the first window;

when the at least one condition is satisfied, processing the first voice input to execute the function of the first application, while maintaining the first window in the background state and maintaining the second application in the foreground state; and when the at least one condition is not satisfied, change operation of the first window to the foreground state and change operation of the second window to the background state, while processing the first voice input.

16. The method of claim 15, wherein the condition is receipt of a second user input from an input device for controlling a function of the second application during a time period when the voice input is received, and wherein the processing of the voice input includes:

change the operation of the first window to the foreground state while processing the voice input, when the second user input based on a input device or a user body is generated for the function of the second application, during the time period starting when the voice input received, wherein the sequence indicated in the path rule includes a first set of states associated with the first application and a second set of states associated with the second application, and wherein the voice input is detected to be applied to the first application when a present state of the electronic device is included among the first set of states associated with the first application.

17. The method of claim 15, wherein the condition is present of a cursor object or pointing object supporting a second user input in the second window when the voice input is received, and wherein the processing of the voice input includes:

changing operation of the first window in the foreground state while processing the voice input, unless the cursor object or the pointing object supporting the second user input is present in the second window, during a time period starting when the voice input is received.

18. The method of claim 15, further comprising:

outputting a specified display object to at least one region of the display of the electronic device, wherein the condition is at least a portion of the specified display object overlapping with at least a portion of the first window in response to a user control before the voice input is ended, and processing of the voice input includes:

changing operation of the first window to be in the foreground state while processing the voice input, unless at least the portion of the specified display object is displayed in overlap with at least the portion of the first window in response to the user control, before the time at which the voice input is ended.

19. The method of claim 15, further comprising:

generating a list indicating at least some of the plurality of application programs stored in a memory of the electronic device; and determining whether the list indicates the second application, when the voice input is generated, wherein the condition is whether the list includes the second application, and wherein the processing of the voice input includes:

changing operation of the first window to be in the foreground state while processing the voice input, unless the list contains the second application.

20. The method of claim 15, further comprising:

displaying a feedback on at least one region of the first window to request for a specified information input, in the processing of the voice input; and controlling the first window to be in the foreground state, when the feedback is displayed.

* * * * *